United States Patent [19]

Umemoto et al.

[11] Patent Number: 5,400,399
[45] Date of Patent: Mar. 21, 1995

[54] SPEECH COMMUNICATION APPARATUS EQUIPPED WITH ECHO CANCELLER

[75] Inventors: Yuji Umemoto, Hachiouji; Koki Otsuka; Yuji Okuda, both of Hino; Masami Akamine, Yokosuka; Koichi Ito, Hino, all of Japan

[73] Assignee: Kabushiki Kaisha Toshiba, Kanagawa, Japan

[21] Appl. No.: 962,589
[22] PCT Filed: Apr. 30, 1992
[86] PCT No.: PCT/JP92/00564
§ 371 Date: Feb. 26, 1993
§ 102(e) Date: Feb. 26, 1993
[87] PCT Pub. No.: WO92/20170
PCT Pub. Date: Dec. 11, 1992

[30] Foreign Application Priority Data

Apr. 30, 1991 [JP] Japan .................. 3-099128
Apr. 10, 1992 [JP] Japan .................. 4-091083

[51] Int. Cl.⁶ .......................... H04M 1/00
[52] U.S. Cl. .................. 379/388; 379/390; 379/391; 379/406; 379/407; 379/410; 379/61; 379/402
[58] Field of Search .......... 379/388, 390, 389, 61, 379/391, 406, 407, 410, 61

[56] References Cited

U.S. PATENT DOCUMENTS

| | | | |
|---|---|---|---|
| 4,629,829 | 12/1986 | Puhl et al. | 379/390 |
| 4,648,110 | 3/1987 | Elsässer | 379/390 |
| 4,819,263 | 4/1989 | Franklin | 379/388 |
| 4,882,745 | 11/1989 | Silver | 379/61 |
| 4,930,156 | 5/1990 | Norris | 379/388 |
| 5,187,741 | 2/1993 | Erving et al. | 379/388 |
| 5,199,065 | 3/1993 | von Zitzewitz et al. | 379/389 |

FOREIGN PATENT DOCUMENTS

| | | |
|---|---|---|
| 57-92928 | 6/1982 | Japan . |
| 60-12828 | 4/1985 | Japan . |
| 61-3536 | 1/1986 | Japan . |
| 64-50655 | 2/1989 | Japan . |

OTHER PUBLICATIONS

Kamitake, "Method for High-Speed Training of Echo Canceller by Chirp Signal Processing", Technical Research Report of Institute of Electronics and Communication Engineers, vol. 82, No. 169, Nov, 18, 1982, Tokyo, pp. 65–72.

*Primary Examiner*—James L. Dwyer
*Assistant Examiner*—Jacques M. Saint-Surin
*Attorney, Agent, or Firm*—Banner, Birch, McKie & Beckett

[57] ABSTRACT

A speech communication apparatus of the present invention includes, in addition to an echo canceller for canceling an acoustic echo generated in a hands-free speech space, a chirp signal generating unit and a training unit. The chirp signal generating unit generates a chirp signal adequate for initial training of the echo canceller. The training control unit enables the chirp signal generating unit to generate a chirp signal, when a predetermined condition for starting hands-free speaking is satisfied, and a chirp tone corresponding to the chirp signal to be output as a volume-amplified tone from the hands-free speaker. The echo canceller performs initial training of the echo canceller based on the chirp tone.

19 Claims, 14 Drawing Sheets

SPEECH COMMUNICATION APPARATUS EQUIPPED WITH ECHO CANCELLER

FIELD OF THE INVENTION

The present invention relates to a hands-free speech function-equipped apparatus of wire telephones, mobile radio-telephones, portable telephones, cordless telephones and, in particular, a speech communication apparatus equipped with an echo canceller for eliminating an acoustic echo which is generated from a speaker for hands-free speech into a microphone, upon reception, in an acoustic environment.

BACKGROUND OF THE INVENTION

Speech communication apparatuses are known which have, in addition to a handset speaking mode for speaking with a handset, a hands-free speaking mode. In the hands-free speaking mode, speaking is done with a speaker and a microphone for hands-free speech which are provided on the communication apparatus body with a handset added thereto, that is, speaking is done with the speaker and microphone in place of the handset. In the hands-free speaking mode, the user can freely use his or her hands during speaking. In a mobile radio-telephone apparatus, for example, a driver can speak with both of his or her hands on a steering wheel. Thus safety is ensured while driving the automobile.

When, however, speaking is done in the hands-free speaking mode, the speaker's voice is reflected back from the walls and ceiling of the automobile to generate an acoustic echo around the microphone. The acoustic echo is largely not desirable on a communication system of relatively great transmission loss, in particular, due to severe degeneration of speech quality. With the digital type mobile radio telephone, for example, a low bit-rate speech encoder is employed for the effective utilization of a radio frequency. For burst errors, an interleaving system is used to enhance the burst error correction capability. For this reason, the transmission delay for speaking on one way of two-way communication apparatuses becomes about 100 msec. When communication is conducted in such a state, an echo is undesirably detected by the user, thus resulting in a large decline in speech quality.

Proposals have been made to employ an echo canceller in this kind of system. The echo canceller estimates the characteristic of an acoustic echo path through the use of an adaptive filter and generates a raise echo having the same characteristic as that on the acoustic echo path. Further, the echo canceller eliminates the false echo from a speech signal and cancels an acoustic echo component in the speech signal.

However, the echo canceller generally requires lots of time until a false echo having the same characteristic as that of the acoustic echo path is generated after the acoustic echo path has been estimated. Therefore, no adequate echo cancellation processing is carried out with the echo canceller immediately after the hands-free speaking is started. An initial echo remains immediately subsequent to the start of the hands-free speaking, thus leading to a decline in speech quality.

SUMMARY OF THE INVENTION

A first object of the present invention is to provide a speech communication apparatus which can eliminate the generation of an initial echo immediately after the start of hands-free speaking and provide high-quality speech.

A second object of the present invention is to provide a speech communication apparatus which can briefly and efficiently initially train an echo canceller.

A third object of the present invention is to provide a speech communication apparatus which, even if a user performs any particular operation for initial training of an echo canceller, can positively perform the initial training, when necessary, at all times.

A fourth object of the present invention is to provide a speech communication apparatus which can naturally perform initial training of an echo canceller without giving any unnatural feeling to the user and make an associated circuit simpler and more compact.

A fifth object of the present invention is to provide a speech communication apparatus which, even when a speech mode is switched to a hands-free speaking mode during speaking in a handset speech mode, can prevent the generation of an initial echo immediately after the start of speaking in the hands-free speaking mode.

In order to achieve the first object of the present invention, a speech communication apparatus is provided which includes, in addition to an echo canceller for canceling an acoustic echo generated in a hands-free speech space, chirp signal generating means for generating a chirp signal for initial training of the echo canceller and training control means. The training control means outputs, as a volume-amplified tone, a chirp tone corresponding to a chirp signal which is generated from the chirp signal generating means in accordance with the creation of a predetermined condition for starting hands-free speaking, and effects initial training of the echo canceller based on the chirp tone.

In the arrangement thus set out above, the initial training of the echo canceller is effected before substantial speaking is done at a hands-free speech start time whereby an optimal characteristic corresponding to the characteristic around a hands-free speech space is set to the echo canceller. Even immediately after the start of the hands-free speaking, an acoustic echo is effectively canceled by the echo canceller so that high-quality speech can be achieved without any adverse effect from the acoustic echo.

In order to achieve the second object of the present invention, a chirp signal is used as a training signal. The chirp signal has the characteristic of being very small in a ratio of a peak power and average power. When, therefore, the initial training of the echo canceller is effected using the chirp signal, it is possible to significantly reduce the time necessary for initial training. Even when the initial training is effected at the start of the hands-free speaking, there is less risk that speaking will be disturbed by the initial training.

In order to achieve the third object of the present invention, the following respective arrangement is employed so that the initial training of the echo canceller may be started. That is, the first arrangement allows detection to be made of the generation of an incoming call and incoming call response operation and is responsive to the generation of the incoming call and incoming call response operation to start initial training. The second arrangement monitors whether or not the incoming call is generated and in response thereto starts initial training. The third arrangement monitors whether or not a speech link is created during a response standby of the communicating party's apparatus after transmission. In response to the detection of the creation of the speech link, initial training starts. The fourth arrangement monitors a calling start instruction input operation and in response thereto starts initial training. The fifth arrangement monitors a dial information input operation necessary for a calling originate operation and in response thereto starts initial training.

These arrangements ensure that the automatic initial training of the echo canceller occurs when detection is made of an operation indispensable for incoming call and calling signals or a change in state of the operation. For this reason, no particular operation is necessary for the initial training of the echo canceller and the operation can be made simpler. Further, the initial training is necessarily performed when hands-free speaking is done upon calling and incoming call operations. For this reason, any undesirable shifting of the speech mode to hands-free speaking prior to initial training being effected is prevented.

These effects are effective for the mobile telephones. That is, if the number of occupants varies, for example, in an automobile after training, it is necessary to reinitialize operation parameters due to a variation in the acoustic characteristics in the automobile. That is, it is necessary to frequently retrain the echo canceller. According to the present invention, the initial training of the canceller is automatically made, as set out above, at calling and incoming times. This makes any complex operation unnecessary. The inconvenience of speaking being started prior to initial training being effected is positively prevented.

Where initial training has to be done with a keypad, it is necessary and cumbersome to perform a respective training key operation each time the acoustic characteristic of the automobile varies. When such a key operation is not done, hands-free speaking starts without the initial training being effected, thus resulting in a decline in speech quality involved.

In order to achieve the fourth object of the present invention, a chirp tone output for initial training serves also as an operation acknowledge tone at the calling and incoming call operation times or as a tone for informing the user of its operation state. In the case where initial training is started responsive to the incoming call response operation, a chirp tone is output in place of an operation acknowledge tone for the incoming call response operation. In the case where initial training is started responsive to the detection of the generation of an incoming call, a chirp tone is output in place of a ringing tone for informing the user of the generation of the incoming call signal. Further, in the case where initial training is started responsive to the inputting of a calling start instruction, a chirp tone is output in place of an operation acknowledge tone for informing the user of a calling start instruction input operation. In the case where initial training is started responsive to the inputting of dial information, a chirp tone is output in place of an operation acknowledge tone for informing the user of the inputting of the dial information.

Since the acknowledge tone for the respective kind of operation and the tone for informing the operation state to the user are shared by the chirp tone, the initial training can be done without the user being conscious of the presence of the chirp tone. It is, therefore, possible to obviate the need to provide any circuit for generating an operation acknowledge tone and informing tone. This can make an associate circuit simpler and more compact.

In order to achieve the fifth object of the present invention, the speech mode switching operation is monitored during handset speaking. Upon the operation of switching the speech mode from the handset speaking mode to the hands-free speaking mode, a chirp tone corresponding to a chirp signal generated from the chirp signal generating means is output as a volume-amplified tone from the speaker and the initial training of the echo canceller is conducted based on the chirp tone.

In the arrangement above, even when the operation of switching the speech mode from the handset speaking mode to the hands-free speaking mode is carried out during the handset speaking, the initial training of the echo canceller is conducted before shifting the speech mode to the hands-free speaking mode. It is thus possible to conduct high quality hands-free speaking.

DETAILED DESCRIPTION

A first embodiment provides one example of applying the present invention to a mobile radio-telephone apparatus having a handset speaking function and a hands-free speaking function.

A dual mode system performs radio communication by selectively using an analog mode and digital mode. In the analog mode, a carrier is, for example, frequency modulated by an analog speech signal in a transmit circuit. In a digital mode, a speech signal is encoded and a carrier is modulated by the encoded speech signal with the use of a digital modulation system, such as a π/4 shifted DQPSK (π/4 shifted, differentially encoded quadrature phase shift keying system) and transmitted.

Figure 1:
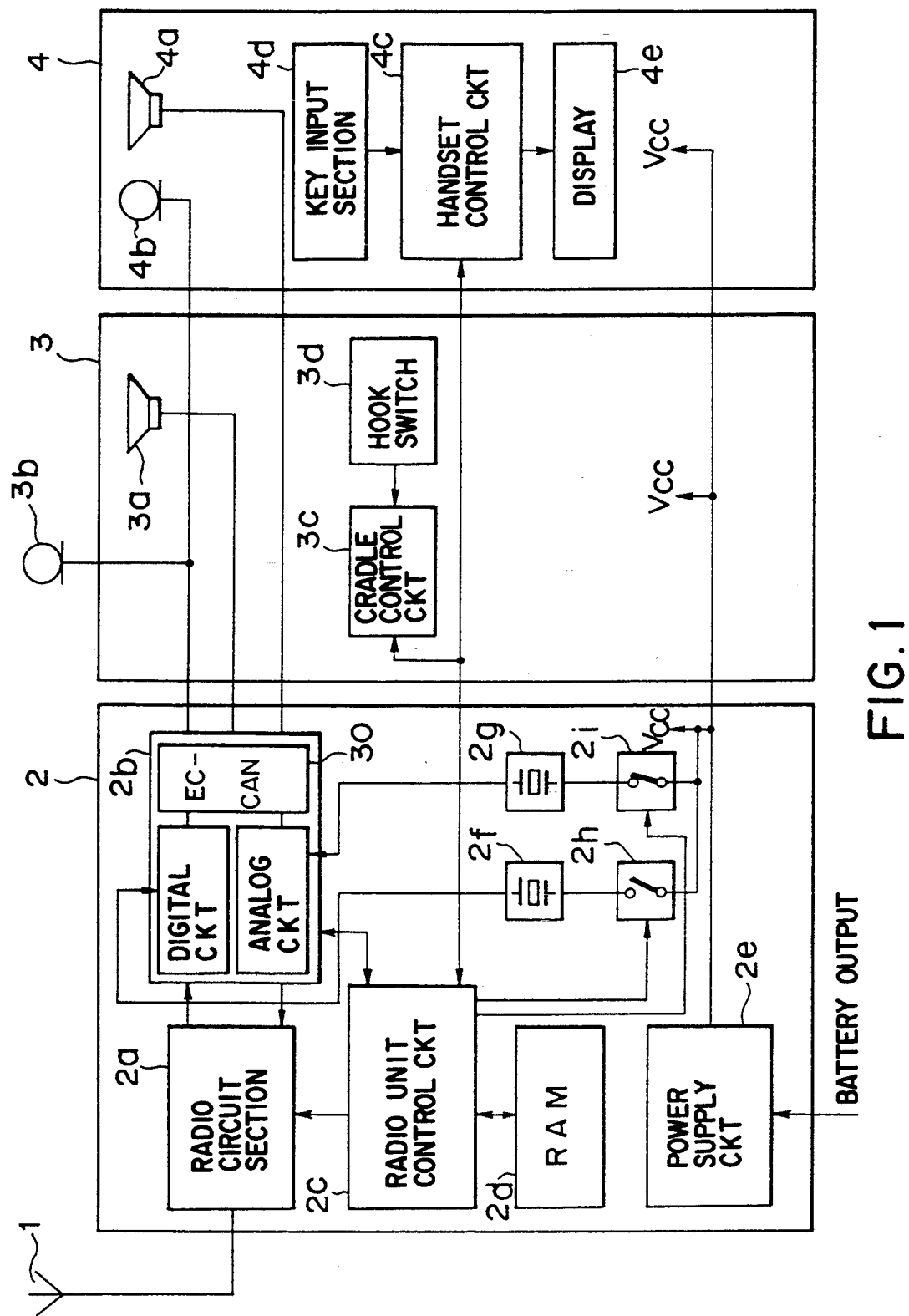
FIG. 1 is a circuit block diagram diagrammatically showing an arrangement of a speech communication apparatus according to a first embodiment of the present invention.

FIG. 1 is a circuit block diagram showing a schematic arrangement of a dual mode mobile radio-telephone apparatus of the present embodiment.

The present apparatus comprises an antenna 1, a radio unit 2, a cradle 3 and a handset 4. The antenna 1 is comprised of, for example, an antenna mounted on automobile body. The radio unit 2 is arranged, for example, in the trunk of the automobile and connected to the antenna via a coaxial cable. The cradle 3 is disposed, for example, at an armrest in the automobile and connected to the radio unit 2 via a cable comprised of a plurality of signal, control and feeder lines twisted together. The handset 4 is detachably placed relative to the cradle and connected relative to the cradle via a curl cord comprised of signal, control and feeder lines twisted together, The radio unit 2 includes a radio circuit section 2a, a speech circuit section 2b, a radio unit control circuit 2c, a RAM 2d for storing data, etc., necessary for control, a power supply circuit 2e, oscillators 2f, 2g and switches 2h, 2i. The speech circuit section 2b includes a digital speech circuit used in a digital mode, an analog speech circuit used in an analog mode and an echo canceller 30. To the digital and analog speech circuits, the oscillators 2f, 2g supply various kinds of clocks. The switches 2h and 2i are turned ON in the digital and analog modes to supply a power supply voltage for excitation of the oscillators 2f and 2g, respectively. The power supply circuit 2e generates a predetermined operation power supply voltage Vcc based on the output of an automobile battery not shown.

The cradle 3 includes a speaker (hereinafter referred to as a hands-free speaker) 3a for hands-free speaking, a microphone (hereinafter referred to as a hands-free microphone) 3b for hands-free speaking, a cradle control circuit 3c and a hook switch 3d.

The handset 4 comprises a speaker (hereinafter referred to as a handset speaker) 4a for handset speaking, a handset control circuit 4c, a key input section 4d, and a display unit 4e. The key input section 4d has dial keys and function keys such as SND and END keys. The SND key is used to input a transmit instruction at an originate time and an acknowledge response at a terminate time. The END key is used to end a call thereby indicating an end of speech. The display unit 4e is comprised of, for example, a liquid crystal display unit and employed to display various items of information, such as the number dialed and the communication operation, etc.

Figure 2A:
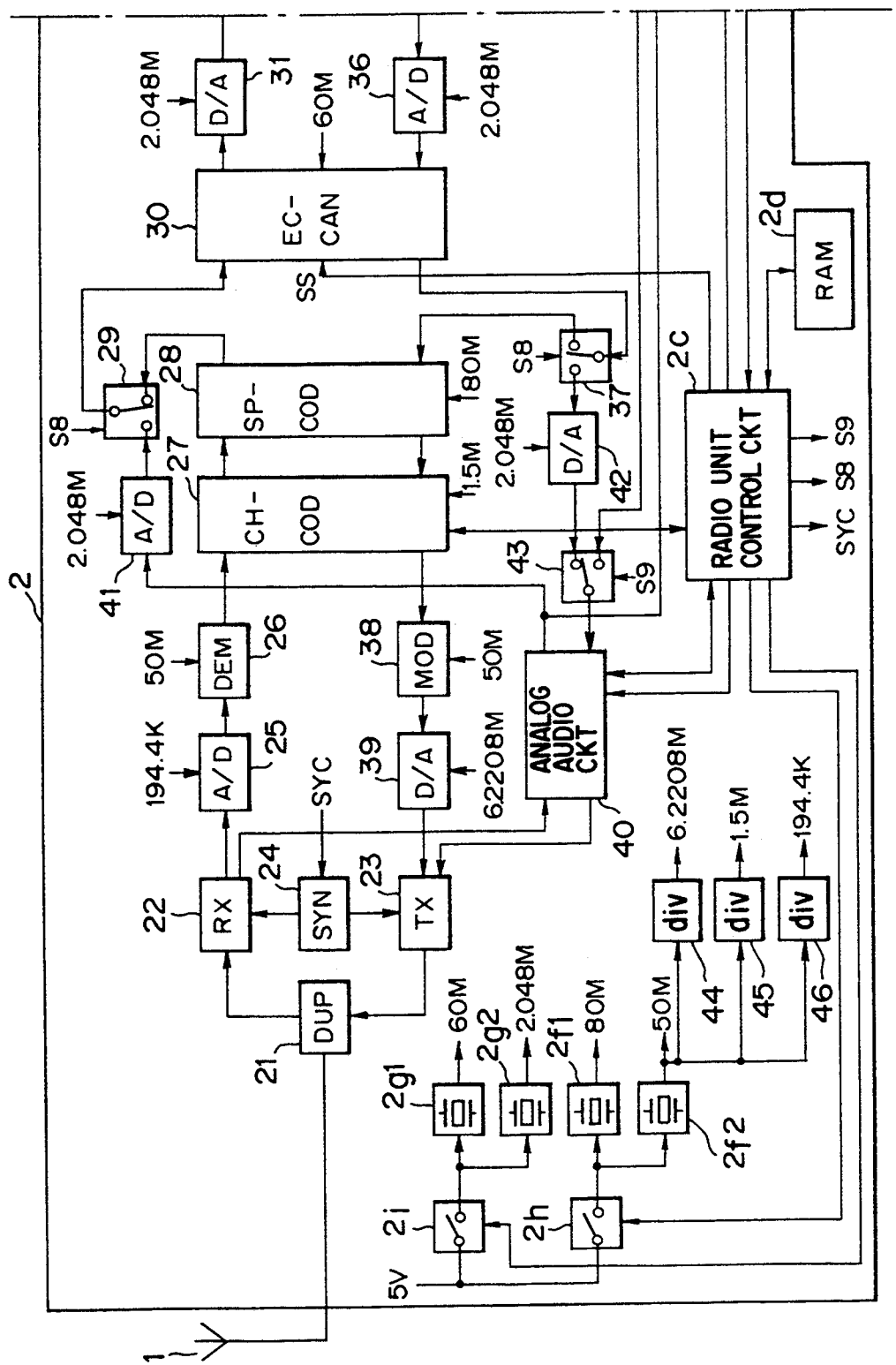
FIGS. 2A and 2B, each, are a circuit block diagram showing a detailed arrangement of the apparatus of FIG. 1.
Figure 2B:
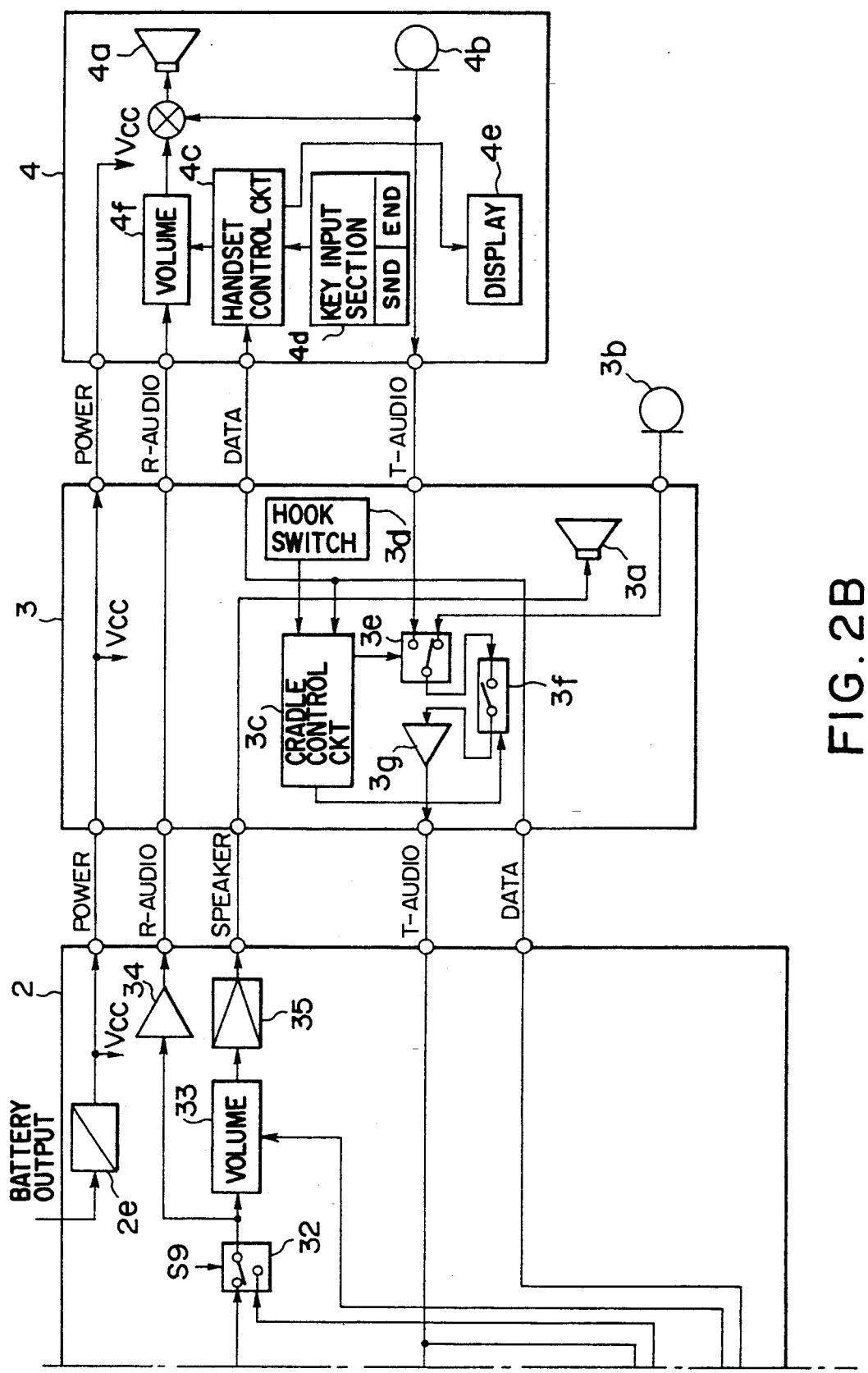

FIGS. 2A and 2B show a detailed arrangement of the radio unit 2, cradle 3 and handset 4.

First, the operation of the circuit system will be explained below with the digital mode set. A radio carrier signal from a base station, not shown, via a given radio channel is received at the antenna 1 and then input to a receiving unit (RX) 22 via a duplexer (DUP) 21. At the receiving unit 22, a received carrier signal is mixed with a local oscillation signal from a frequency synthesizer 24 to obtain an intermediate frequency signal as a frequency-converted signal. After being converted by an A/D converter 25 to a digital signal, the received intermediate frequency signal is supplied to a digital demodulation circuit (DEM) 26. At the digital demodulation circuit 26, the received intermediate frequency signal is demodulated to obtain a received base band signal. The received base band signal is subjected by a channel-codec (CH-COD) 27 to error correction and then to speech demodulation processing by a speech-codec (SP-COD) 28.

The received digital signal output from the speech-codec 28 is input to a change-over switch 29. The change-over switch 29 is controlled such that, with the digital mode set, a received speech signal output from the speech-codec 28 is selectively output by a control signal $8 output from a radio unit control circuit. With the digital mode in the set state, therefore, the received speech signal input from the speech-codec 28 is input via the change-over switch 29 to an echo canceller (EC-CAN) 30. The received digital speech signal passed through the echo canceller 30, after being converted to a received analog speech signal, is input to a change-over switch 32. The change-over switch 32 is controlled such that, with the digital mode set, a received analog speech signal output from the D/A converter 31 is selectively delivered as an output with a control signal S9 output from the radio unit control circuit 2c. The received analog speech signal is thus passed through the change-over switch 32.

The received analog speech signal is branched into two routes. The signal on one route is supplied via a buffer amplifier 34 and the cradle 3 to the handset 4. With the handset speaking mode selected, the received speech signal, after being volume-controlled by a volume 4f, is output from the handset speaker 4a in the handset 4. With the hands-free speaking mode selected, the received speech signal, after being volume-controlled by a volume 33, is amplified by an amplifier 35 and delivered to the cradle 3. The received speech signal is output, as a volume-amplified output, from the hands-free speaker 3a on the cradle 3.

A handset transmit speech signal from a user which has been detected by the handset microphone 4b and then subjected to acoustic/electric conversion is input to a change-over switch 3e on the cradle 3. The change-over switch 3e is controlled so that, with the handset speaking mode set, the handset transmit speech signal is selectively output by the cradle control circuit 3c and with the hands-free speaking mode set, the hands-free transmit speech signal is selectively output. Whether the handset speaking mode or the hands-free speaking mode is set is determined, by the cradle control circuit 3c, in accordance with the state of the hook switch 3d. The handset speaking mode is determined with the handset 4 lifted up from the cradle 3 and the hook switch 3d in an off-hook state. On the other hand, the hands-free speaking mode is determined with the handset 4 placed on the cradle 3 and the hook switch 3d in an on-hook state. The transmit speech signal output from the change-over switch 3e is supplied to the radio unit 2 via a switch 3f and buffer amplifier 3g.

In the radio unit 2, the transmit speech signal, after being converted to a digital signal by an A/D converter 36, is supplied to the echo canceller 30. In the echo canceller 30, digital signal processing cancels an acoustic echo from the transmit speech signal. The digital transmit signal output from the echo canceller 30 is supplied to a change-over switch 37. The change-over switch 37 is controlled such that, with the digital mode set, the digital transmit signal is input to the speech-codec 28 with a control signal S8 output from the radio unit control circuit 2c. In the analog mode set, the digital transmit signal is supplied to a D/A converter 42.

The speech-codec 28 subjects the digital transmit signal to code processing. The coded digital transmit signal is subjected to error correction processing by the channel-codec 27 and then supplied to a digital modulation circuit (MOD) 38. The digital modulation circuit 38 modulates the coded digital transmit signal using a modulation signal in accordance with a radio channel frequency. For example, a $\pi/4$ shifted DQPSK system is employed as a digital modulation system. The modulated signal output from the digital modulation circuit 38, after being converted to an analog signal, is supplied to a transmit circuit (TX) 23. In the transmit circuit 23, the modulated signal is mixed with a local oscillation signal from the frequency synthesizer 24, converted to a radio frequency band signal and power-amplified to a predetermined transmit power level. The radio carrier signal output from the transmit circuit 23 is fed via the duplexer 21 to the antenna 1 and transmitted from the antenna 1 to the base station not shown.

The operation of the circuit system will be explained below with the analog mode set. A received intermediate frequency signal output from the receiving unit 22 is supplied to an analog audio circuit 40. The analog audio circuit 40 performs the FM detection of the received intermediate frequency signal and analog signal processing, such as the filtering, low frequency amplification, etc. so that the received analog baseband speech signal is reproduced.

The received analog speech signal output from the analog audio circuit 40 is branched into two routes. Via one of the two branch routes, the received analog speech signal is converted by the A/D converter 41 to a digital signal and supplied to the change-over switch 29. The change-over switch 29 is controlled such that, with the analog mode set, a received speech signal output from the A/D converter 41 is selectively delivered with the control signal S8 output from the radio unit control circuit 2c. With the analog mode set, a received speech signal is input via the change-over switch 29 to the echo canceller 30 after it has been output from the analog audio circuit 40 and A/D converted by the A/D converter 41. After being passed through the echo canceller 30, the received digital speech signal is converted by the D/A converter 31 back to an analog signal and supplied to the change-over switch 32. Via the other route, the received analog speech signal is directly input to the change-over switch 32 without being passed through the echo canceller 30.

The change-over switch 32 is controlled such that, with the analog mode set and the handset speaking mode selected, the received analog speech signal directly coming from the analog audio circuit 40 is selectively delivered with the control signal S9 output from the radio unit control circuit 2c. With the analog mode set and the hands-free speech mode selected, the received analog speech signal output from the A/D converter 31 is selectively delivered as an output.

The received analog speech signal selectively delivered from the change-over switch 32 is branched into two routes. Via one of these routes, the received analog speech signal is fed through the buffer amplifier 34 and cradle 3 to the handset 4. With the handset speaking mode selected, the received analog speech signal, after being volume-controlled by the volume 4f in the handset 4, is output from the handset speaker 4a. With the hands-free speaking mode selected, the received speech signal on the other route, after being volume-controlled by a volume 33, is amplified by the amplifier 35 and output from the hands-free speaker 3a in the cradle 3.

The analog transmit speech signal input from the cradle 3 to the radio unit 2 is branched into two routes in the radio unit 2. Via one of these routes, the analog transmit speech signal, after being converted to the digital signal by the A/D converter 36, is input to the echo canceller 30 because the hands-free speaking mode is involved. The digital transmit speech signal, after the acoustic echo component is canceled by the echo canceller 30, is supplied via the change-over switch 37 to the D/A converter 42 where the digital transmit speech signal is converted back to an analog transmit speech signal. The analog transmit speech signal is input to the change-over switch 43. Via the other route, the branched analog transmit speech signal is input directly to the change-over switch 43 without being passed through the echo canceller 30 because the handset speaking mode is involved.

The change-over switch 43 is controlled such that, with the hands-free speaking mode selected, the transmit speech signal passing through the echo canceller 30 is selectively delivered as an output with the control signal S9 output from the radio unit control circuit 2c. With the handset speech mode selected, the transmit speech signal directly supplied without being passed through the echo canceller 30 is selectively delivered from the change-over switch 43 and supplied to the analog audio circuit 40. In the analog audio circuit 40, a carrier signal is subjected by the transmit speech signal to FM modulation processing. The modulated signal output from the analog audio circuit 40 is supplied to the transmit circuit 23. In the transmit circuit, the modulated signal is mixed with a local oscillation signal from the frequency synthesizer 24, converted to a radio frequency signal and power-amplified to a predetermined transmit power level. A radio carrier signal output from the transmit circuit 23 is fed via the duplexer 21 to the antenna 1 and transmitted from the antenna 1 to the base station, not shown.

Oscillators 2g1 and 2g2 generate 60 MHz and 2.048 MHz clocks, respectively. The 60 MHz clock is supplied to the echo canceller 30 and the 2.048 HMz clock is supplied to the A/D converters 36, 41 and D/A converters 31, 42. Oscillators 2f1 and 2f2 generate 80 MHz and 50 MHz clock. The 80 MHz clock is supplied to the speech code demodulation circuit 28 and the 50 MHz clock is supplied to the digital demodulation circuit 26 and digital modulation circuit 38. Frequency dividers 44, 45 and 46 generate 6.2208 MHz, 1.5 MHz and 194.4 MHz clocks based on the clock (50 MHz) generated from the oscillator 2l2. The 6.2208 MHz clock is supplied to a D/A converter 39, the 1.5 MHz clock is supplied to the error correction code demodulation circuit 27, and the 194.4KHz clock is supplied to the A/D converter 25.

Figure 3:
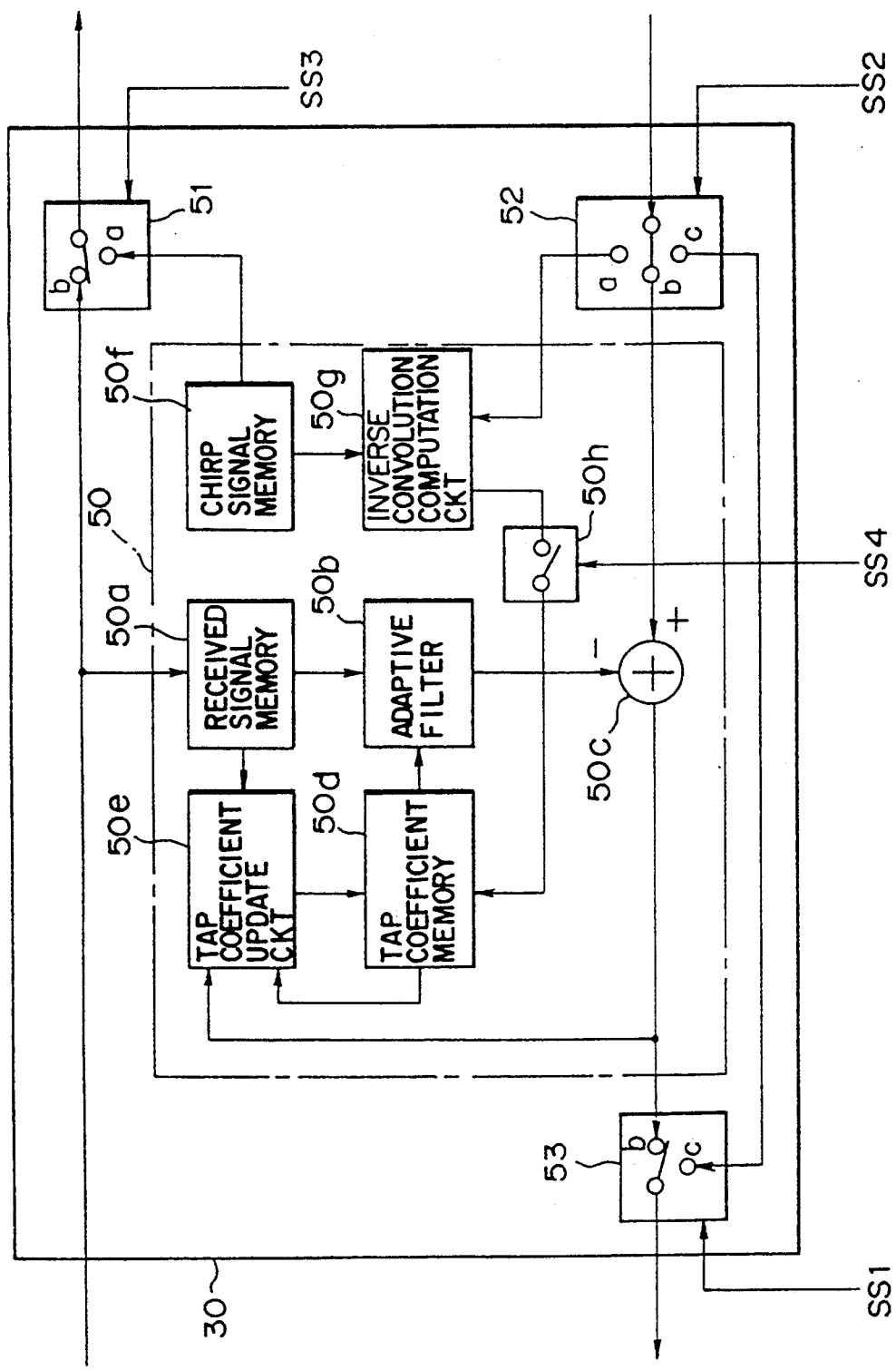
FIG. 3 is a circuit block diagram showing an arrangement of an echo canceller provided in the apparatus shown in FIG. 2A.

FIG. 3 is a circuit block showing an arrangement of the echo canceller 30.

The echo canceller 30 comprises an echo canceller body 50 constituted by, for example, a DSP (digital signal processor) and change-over switches 51, 52 and 53.

The echo canceller body 50 comprises a received signal memory 50a, an adaptive filter 50b, an arithmetic operation unit 50c, a tap coefficient memory 50d and a tap coefficient update circuit 50e. The body 50 further comprises a chirp signal memory 50f, an inverse convolution computation circuit 50g, and a write switch 50h for tap coefficient initialization. The receive signal memory 50a stores a digital receive speech signal. The adaptive filter 50b is comprised of a transversal filter. This filter generates a false echo based on the received digital speech signal stored in the received signal memory 50a and a tap coefficient stored in the tap coefficient memory 50d. The computation circuit 50b performs digital computation processing for subtracting the false echo which is generated by the adaptive filter 50b from the received digital speech signal. The tap coefficient memory 50d stores the tap coefficient of the adaptive filter 50b therein. The tap coefficient update circuit 50e updates the tap coefficient in the tap coefficient memory 50d on the basis of a residual echo which is output from the arithmetic operation unit 50c.

The chirp signal memory 50f initially stores a training signal series f(K) for initial training which is obtained by cutting a chirp signal series of an M cycle to time points—N+1 to M−1. The character "M" above is defined as P≦M, assuming that the order of the adaptive filter 50b is given by P. The chirp signal memory 50f reads out the training signal series f(K), during an initial training period of the echo canceller 30, in accordance with an instruction of the radio unit control circuit 2c. The training signal series f(K) is input to the change-over switch 51. During the initial training period, the change-over switch 51 is switched by a control signal SS3 which is output from the radio unit control circuit 2c. The training signal series f(K) which is output from the chirp signal memory 50f during the initial training period is convened by the D/A converter 31 to an analog signal via the change-over switch 51 and then output to the cradle 3. In the cradle 3, the analog signal is output from the hands-free speaker 3a as a chirp tone (a volume-amplified voice).

The chirp tone is reflected on the window and ceiling of the automobile and picked up, as an acoustic echo, by the hands-free microphone 3b of the cradle 3. After being converted by the A/D converter 36 to a digital signal, a signal series gj (j=0 to M−1) corresponding to the acoustic echo of the chirp tone is input to the change-over switch 52 of the radio unit 2. During the initial training period of the echo canceller 30, the change-over switch 52 is switched by a control signal SS2 which is output from the radio unit control circuit 2c. Thus, the signal series gj (j=0 to M−1) corresponding to the acoustic echo is supplied via the change-over switch 52 to the inverse convolution computation circuit 50g. In the inverse convolution computation circuit 50g, the inverse convolution computation set out below is carded out using the signal series gj (j=0 to M−1) corresponding to the acoustic echo. By so doing, it is possible to estimate an impulse response hi (i=0 to P−1) of the acoustic echo. It is to be noted that 02 shows an average electric power of the chirp signal series.

$$hi = 1/M D \cdot \sigma 2 \times \sum_{j=0}^{M-1} gj \cdot f(j-1) \quad (1)$$

The switch 50h for initialization is switched ON in accordance with a control signal SS4 which is output from a control circuit 2c after the estimation of an impulse response hi of the acoustic echo by the inverse convolution computation circuit 50g. The impulse response hi of the acoustic echo estimated by the inverse convolution computation circuit 50g is supplied to the tap coefficient memory 50d. The tap coefficient memory 50d stores, as an initial value of the tap coefficient, the impulse response hi.

The change-over switches 52 and 53 are controlled so that in the hands-free speaking mode selected, these switches are switched to the contact b in accordance with the control signals SS2 and SS1 output from the radio unit control circuit 2c. These switches are switched to the contact c in the case where the echo canceller 30 has to be bypassed.

The operation of the mobile radio-telephone apparatus according to the present invention will be explained below.

Figure 4:
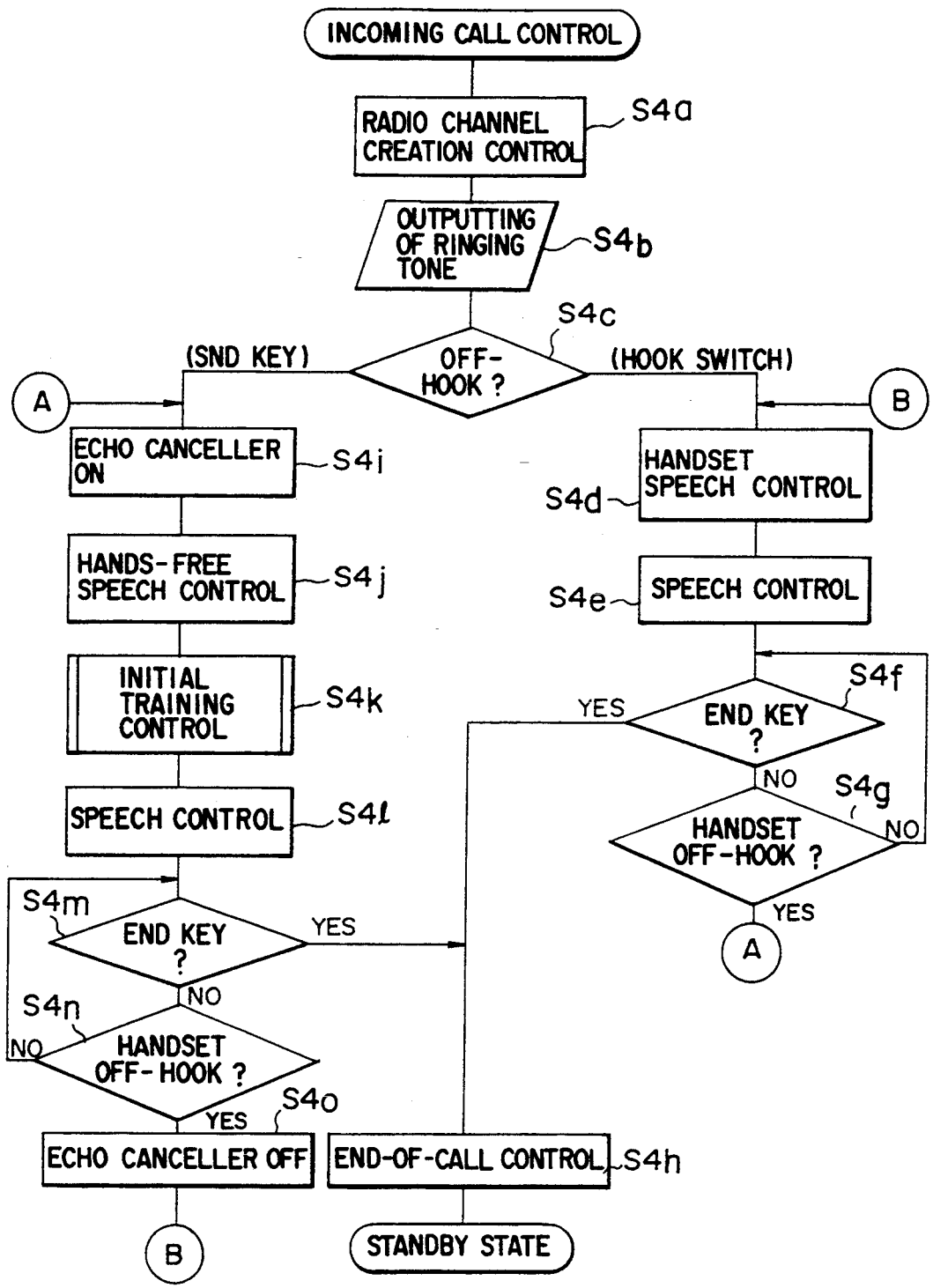
FIG. 4 is a flow chart for showing an incoming call control procedure and control contents of a control circuit provided in the apparatus shown in FIGS. 2A and 2B.

In the standby state, the arrival of an incoming call signal and a calling operation are monitored by the control circuits 2c, 3c and 4c. When, in this state, an incoming call signal arrives from the base station, not shown, the apparatus starts incoming call control. FIG. 4 illustrates a flow chart showing the control procedure and control contents of the incoming call control operations.

In the standby state, when the incoming call signal arrives via a paging channel, an access channel is established between the base station and the present apparatus in accordance with a predetermined protocol. A radio channel (radio speech link) is established based on a speech channel designation signal sent via the access channel from the base station (step S4a). When start control information arrives at the present apparatus via the radio speech link, the present apparatus delivers a ringing tone from, for example, a hands-free speaker 3a at step S4b, thus alarming the user about the arrival of the incoming call signal. In this state, the user responds to the alarm by lifting up, for example, the handset 4. Then the apparatus determines the state of an off-hook operation at step S4c. When the apparatus determines that the handset is in a handset speaking mode, control shifts to a step S4d to allow speaking in the handset speaking mode. When the apparatus is set to a handset speaking state, control shifts for speech to step S4e. A user can talk in the handset speaking mode. In the handset speaking mode, the echo canceller 30 is set to be in an inoperative state.

In the handset speaking mode, the apparatus monitors the operation of an END key and off-hook operation of the handset 4 at steps S4f and S4g, respectively. With the END key depressed, the end of the call is determined, thus shifting control to step S4h and returning the apparatus back to a standby state.

If the user depresses a SND key during the alarming of the incoming call signal, the apparatus determines the hands-free speaking mode to be selected by step S4c and control is shifted for speech. That is, at step S4i, the echo canceller 30 is set to an operative state and then in step 4j control is implemented for allowing hands-free speaking.

With the hands-free speaking in an enabled state, control is shifted to step S4k, allowing the initial training of the echo canceller 30 to be implemented. That is, in step S6a, the change-over switches 51, 52 of the echo canceller 30 are switched to the contact a and, in this state, a training signal series f(k) of a given length is read out of the chirp signal memory 50f at step S6b. By so doing, the training signal series f(k) is delivered to the received signal route via the change-over switch 51. After being converted to an analog signal by the D/A converter 31 and fed to the hands-free speaker 3a in the cradle 3, the signal is output as a chirp tone (volume-amplified tone) from the hands-free speaker 3a.

When the chirp tone is output, a corresponding acoustic echo is input from the glass window and ceiling in the automobile to the hands-free microphone 3b. A signal corresponding to the acoustic echo is converted by the A/D converter 36 to a digital signal and then input to the echo canceller 30. A signal series gj corresponding to the acoustic echo is fed via the change-over switch 52 to the inverse convolution computation circuit 50g in the echo canceller 30. By so doing, the computation of the formula (1) above is implemented in the inverse convolution computation circuit 50g on the basis of the signal series gf of the acoustic echo and, it is possible to estimate an impulse response hj across the hands-free speaking space.

At this time, the control circuit 2c monitors, at step S6c, whether or not the estimation of the above impulse response is completed. Upon the completion of the estimation of the impulse response hi, control is shifted to step S6d and, the control circuit 2c turns the write switch 50b ON. At step S6e, the tap coefficient memory 50d is set in the write-enabled state. For this reason, an estimate of the impulse response hi output from the inverse convolution computation circuit 50g is transferred via the switch 50h to the tap coefficient memory 50d and is stored, as an initial value of the tap coefficient.

The method for high-speed training by chirp signal processing is described in detail in Kamitake "Method for High-Speed Training of Echo Canceller by Chirp Signal Processing" of the "Institute of Electronics and Communications Engineers of Japan" Technical Bulletin CS82-169 N048.

When the initialization of the tap coefficient is completed, control is shifted from step S6f to step S6g and the control circuit 2c returns the write switch 50h to the OFF state. At step S6h, switches the change-over switches 51 and 52 switch to the contact b. The apparatus starts speech control in step S4e, in a hands-free speaking mode.

Thereafter, the apparatus is placed in the hands-free speaking state and the user can talk in the hands-free speaking mode. At this time, the echo canceller 30 performs the following operation using, as an initial value, the tap coefficient initialized to the tap coefficient memory 50d.

The received tone signal demodulated by the speech-codec 28 is input via the change-over switch 29 to the echo canceller 30. The received tone signal passes through the echo canceller 30, after being converted to an analog signal. Thereafter, the received tone signal is subjected, by the volume 33 and tone amplifier 35, to volume control via the change-over switch 32 and then output as an amplified volume tone from the hands-free speaker 3a in the cradle 3.

The transmit voice of the user, together with the acoustic echo routed from the hands-free speaker 3a, is picked up by the hands-free microphone 3b to generate a transmit speech signal. The transmit speech signal, after being passed through the change-over switch 3e and converted by the A/D converter 36 to a digital signal in the radio unit 2, is input to the echo canceller 30. In the echo canceller 30, an arithmetic operation is performed, in the arithmetic operation unit 50c, for subtracting from the digital transmit speech signal a false echo which is generated at the adaptive filter 50b.

By so doing, it is possible to cancel the false echo contained in the digital transmit speech signal. At this time, the generation of a false echo is started, in the adaptive filter 50b, using, as an initial value, the tap coefficient which is set for initial training. For this reason, the echo canceller 30 performs echo cancellation processing to significantly reduce a residual echo immediately after the start of the hands-free speaking.

The digital transmit speech signal whose acoustic echo is canceled is sequentially input via the change-over switch 37 to the speech-codec 28 and channel-codec 27 for coding processing. The digital transmit speech signal is transmitted from the transmit circuit 23 via the antenna 1 to the base station.

After the start of the echo cancellation operation, the echo canceller 30 updates the tap coefficient of the adaptive filter 50b approximately to an optimum value for the hands-free speech space. To update the tap coefficient, a normalized learning matching system (NLMS) is employed which normalizes, for example, a least-mean-square system. The algorithm of the learning matching system is advantageous for it reduces the amount of computation and provides a better characteristic. The equation (2) below shows an update equation for the learning matching method when a P-degree adaptive filter tap coefficient is represented by hj(,j=1 p):

$$hj(n+1) = hj(n) + \mu[e(n) \cdot y(n)] / \sum_{K=0}^{P-1} y^2(n-k) \quad (2)$$
$$(0 < \mu < 2)$$

where
y(n): a signal input to the arithmetic operation unit 50c; and
e(n): a residual echo output from the arithmetic operation unit 50c.

In the hands-free speaking state, the apparatus monitors, at steps S4m and S4n, the END key operation and off-hook operation, respectively. If, in this state, the END key is depressed, control is shifted to step S4h and end-of-call control is carried out, returning the apparatus back to a standby state.

In the hands-free speaking state, when the user lifts up the handset 4 from the cradle 3, the apparatus determines that the switching operation is made from the hands-free speaking mode to the handset speaking mode. Then control is shifted from step S4n to step S4o and, here, the echo canceller 30 is turned OFF and then at step S4d the handset speech enabling control is carried out. Then handset speech control is shifted by step S4e. Thus, the user can continue speaking in the handset speaking mode.

Now suppose that, in the handset speaking state, the user places the handset 4 back to the cradle 3 to switch from the handset speaking mode to the hands-free speaking mode. Then, control is shifted from step S4g to step S4i and the apparatus sets the echo canceller 30 from the inoperative state to the operative state. Then control is shifted to step S4j to enable hands-free speaking. With the hands-free state in an enabled state, the apparatus implements initial training control at step S4k. The initial training control procedure and control contents are the same as those set out in connection with FIG. 6. When the initial training of the echo canceller 30 is completed, the apparatus is shifted to the hands-free speech control at step S4l.

That is, even when the speech mode is switched to the hands-free speaking mode during the handset speaking, the apparatus implements the initial training of the echo canceller 30 when starting the hands-free speaking.

Figure 5:
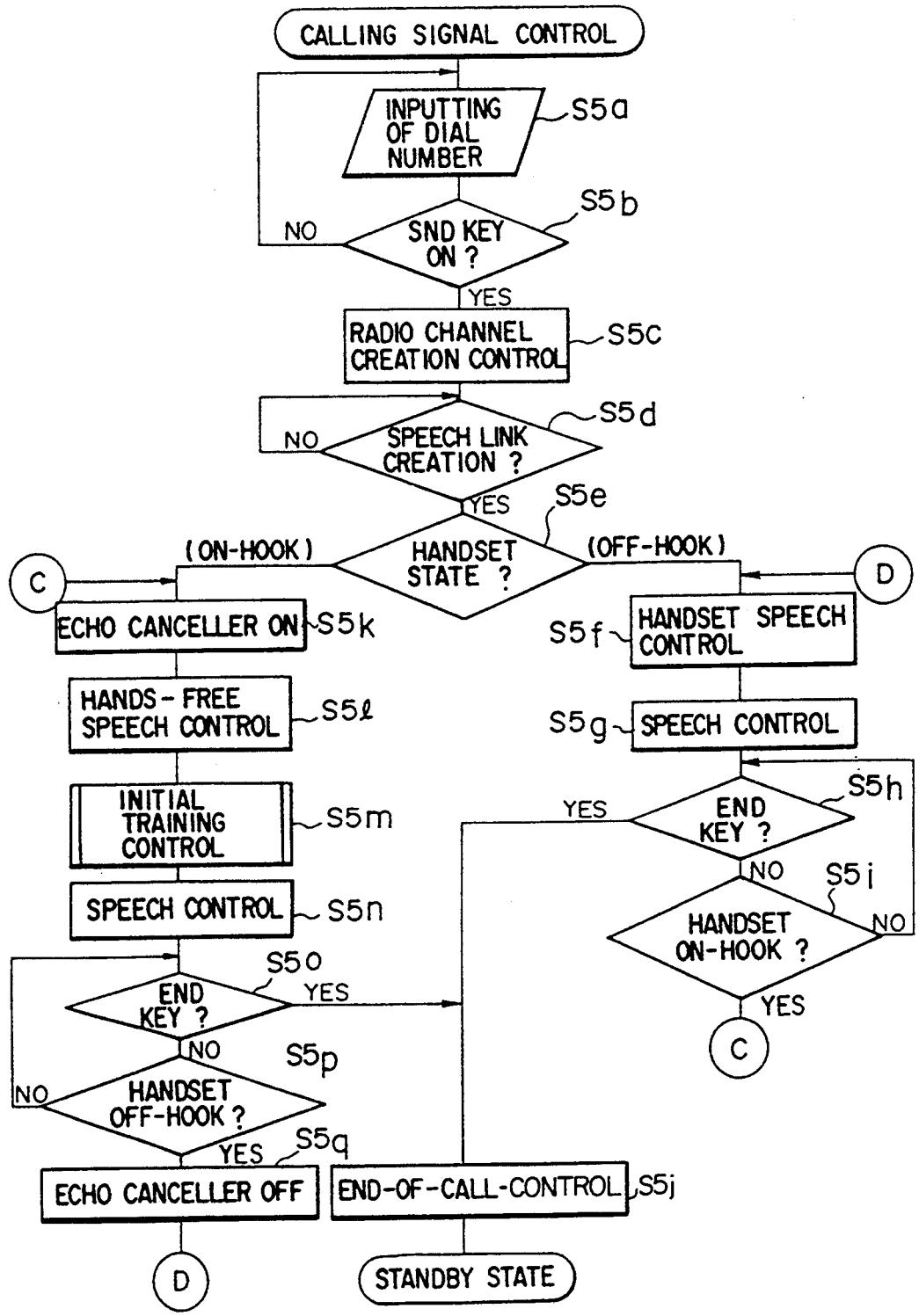
FIG. 5 is a flow chart showing a calling signal control procedure and control contents of a control circuit shown in FIGS. 2A and 2B.

The transmit control operation of the mobile radiotelephone apparatus of the present invention will be explained below. FIG. 5 illustrates a flow chart showing the control procedure and control items of the apparatus.

In the standby state, the input operation of a dial number is started by the user upon transmission to a called party. Then the dial number is sequentially input at step S5a and the apparatus stores it in a register in the handset control circuit 4c. At step S5b, the depression of the SND key is monitored.

In this state, it is assumed that all the digits of the dial number have been entered and the SND key has been depressed. Then the apparatus implements a control operation for establishing a radio channel (access channel) to the base station at step S5c. The dialed information corresponding to the dial number stored is sent over an access channel. When a speech channel designation signal arrives at the apparatus from the base station over the access channel, the apparatus tunes to the designated speech channel, thus establishing a speech link at step S5d.

Then control is shifted from step S5d to step S5e and the apparatus determines the state of the handset 4. If, for example, the handset is placed in an off-hook state, the handset speech mode has been selected state and control is shifted to step S5f. Here the apparatus makes handset speech enable control. The apparatus is now placed in the handset speech enable state and control is shifted to step S5g and handset speech control is started. Thus, the user can talk in a handset speaking mode. While in the handset speaking state, the echo canceller 30 is set in an inoperative state.

During the handset speaking, the apparatus monitors, at steps S5h and S5i, the END key depression operation and handset off-hook operation, respectively. When the END key is depressed, control is shifted to step S4h and end-of-call control is effected, thus returning the apparatus to a standby state.

At a point of time when there is a response at the apparatus of the called party, the handset 4 is placed in an on-hook state. When this is done, the apparatus determines the hands-free speaking mode to be in a selected state, control shifts from step S5e to step S5k and, here, the echo canceller 30 is set to an operative state and then control is shifted to step S5l and hands-free speech enable control is carried out. With the hands-free speaking in an enabled state, the apparatus implements the initial training of the echo canceller 30 at step S5m. The initial training control procedure and control contents are the same as set out in connection with FIG. 6. When the initial training of the echo canceller 30 is ended, control is shifted to step S5n and the apparatus provides hands-free speech control and the user can talk in the hands-free speaking mode.

In the hands-free speaking mode, the apparatus monitors, at step S5o and step S5p, the END key depression operation and handset off-hook operation, respectively. When the end key is depressed, control is shifted to step S5j. Here the apparatus implements an end-of-call operation, thus returning to the standby state.

When, during the hands-free speaking, the handset 4 is placed in the off-hook state, the operation mode has been switched from the hands-free speaking mode to the handset speaking mode. At step S5q, the echo canceller 30 is set to the inoperative state and control is shifted to the S5f and a handset call enable control operation is carded out.

In the handset speaking mode, when the handset 4 is placed in the on-hook state, the operation mode has been switched from the handset speaking mode to the hands-free speaking mode. Control is shifted to step S5k and here the echo canceller 30 is set to an operative state. At step S5l hands-free speech enable control is carried out, the initial training control of the echo canceller 30 is effected at step S5m. After initial training, control is shifted to step S5n and the apparatus performs hands-free speech control.

According to the present invention, after the hands-free speech enable control is implemented at an incoming call time in accordance with an incoming call response by the SND key but before the hands-free speaking is substantially started, the initial training of the echo canceller 30 is executed with a chirp tone. Further, after the hands-free speech enable control is implemented at a transmit time in accordance with the establishment of a speech link upon response from the apparatus of the called party but before the hands-free speech enable control is substantially started, the initial training of the echo canceller 30 is done with a chirp tone. By so doing, an optimal characteristic corresponding to the hands-free speech space is initialized to the echo canceller 30. Even immediately after the start of the hands-free speaking, the acoustic echo is effectively canceled by the echo canceller. Therefore, the user can start high-quality hands-free speaking without being adversely affected by the acoustic echo immediately after the start of speaking.

According to the present embodiment, since the chirp tone is used as an initial training signal, it is possible to perform the initial training in a very brief period of time. For this reason, in spite of the fact that the initial training is effected at the time of starting hands-free speaking, the hands-free speaking is smoothly started without imparting any adverse effect, such as noise interference.

According to the present embodiment, where any operation indispensable to the incoming call and calling signals, or a variation in the state operation is detected, the initial training of the echo canceller 30 is automatically carried out. For this reason, it is not necessary to perform any particular operation for the initial training of the echo canceller 30. It is, therefore, possible to perform that operation in a simpler way.

Since the automatic training is effected for each incoming call signal or for each calling signal, the cancellation of the acoustic echo can normally be done, at the hands-free speech time, based on the cancellation information which is optimal at each time. Even if the acoustic characteristic varies in an occupied space of the automobile due to a variation in the number of occupants in the automobile during the call, it is possible to always conduct a call with the best quality. Further, when there is a break in a power supply during the standby state and cancellation information is erased in the tap coefficient memory 50d, then automatic training is effected at the time of starting the hands-free speaking and, at that time, the optimal cancellation information is written into the tap coefficient memory 50d. For this reason, it is not necessary to protect the storage information in the tap coefficient memory 50d with a backup power supply. In this way, the circuit arrangement can be made simpler and more compact. An inexpensive circuit arrangement can be obtained without the need to provide high-cost memory elements, such as an EEPROM.

According to the present invention, even where the speech mode is switched from the handset speaking mode to the hands-free speaking mode either during a speaking start time or during speaking, the initial training of the echo canceller 30 is done before the hands-free speaking is substantially started. The result is initialized to the echo canceller 30. For this reason, speaking is started in the handset speaking mode and, even when, during a call, the operator switches to the hands-free speaking mode, it is possible to shift to the hands-free speaking mode after the echo canceller 30 effects the initial training. Even if the mode is switched to the speaking mode during a call, it is possible to start a hands-free speaking of high quality without being adversely affected by the acoustic echo, even immediately after the start of speaking.

A second embodiment corresponds to an embodiment in which the present invention is applied to a digital, portable telephone equipped with a handset speaking function and hands-free speaking function.

Figure 7:
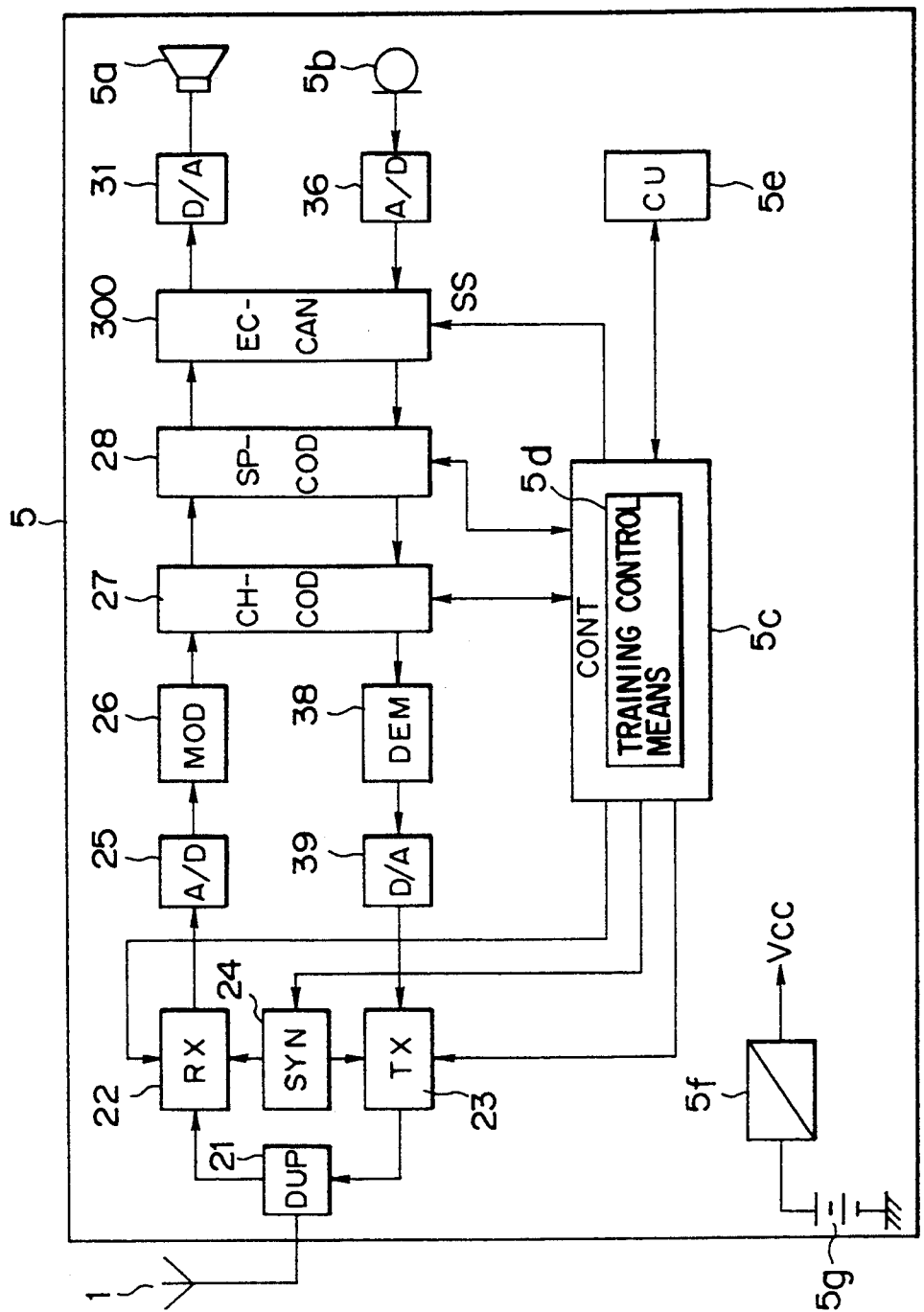
FIG. 7 is a circuit block diagram showing an arrangement of a speech communication apparatus according to a second embodiment of the present invention.

FIG. 7 illustrates a circuit block showing an arrangement of a digital, portable telephone of the second embodiment. The same reference numerals are employed in the second embodiment to designate parts or elements corresponding to those shown in FIGS. 2A and 2B and any further detailed explanation of them is, therefore, omitted for brevity's sake.

The portable telephone of the present invention comprises an antenna 1 and a portable telephone body 5.

A received digital speech signal output from a speech-codec 28 is supplied via an echo canceller 300 to a D/A converter 31 where it is converted to an analog signal. Then the analog signal is amplified by an amplifier, not shown, and then output as a volume-amplified output from a speaker 5a. The speaker 5a serves not only as a handset speaker, but also as a hands-free speaker. The amplifier above is comprised of, for example, a variable gain amplifier. When being used as the handset speaker, the speaker has its gain set to deliver a received speech signal of a small amplitude level. When the speaker is used as a hands-free speaker, its gain is set to deliver a received speech signal of a greater amplitude level.

The telephone body 5 has a microphone 5b which serves as a handset/hands-free shared microphone. The received speech of the user is sensed by the microphone 5b and, after being subjected to an acoustic/electric conversion, is converted by an A/D converter 36 to a digital signal and then input to an echo canceller 300. The echo canceller 300 performs digital signal processing for canceling an acoustic echo component contained in the digital transmit speech signal coming from the A/D converter 36.

Figure 8:
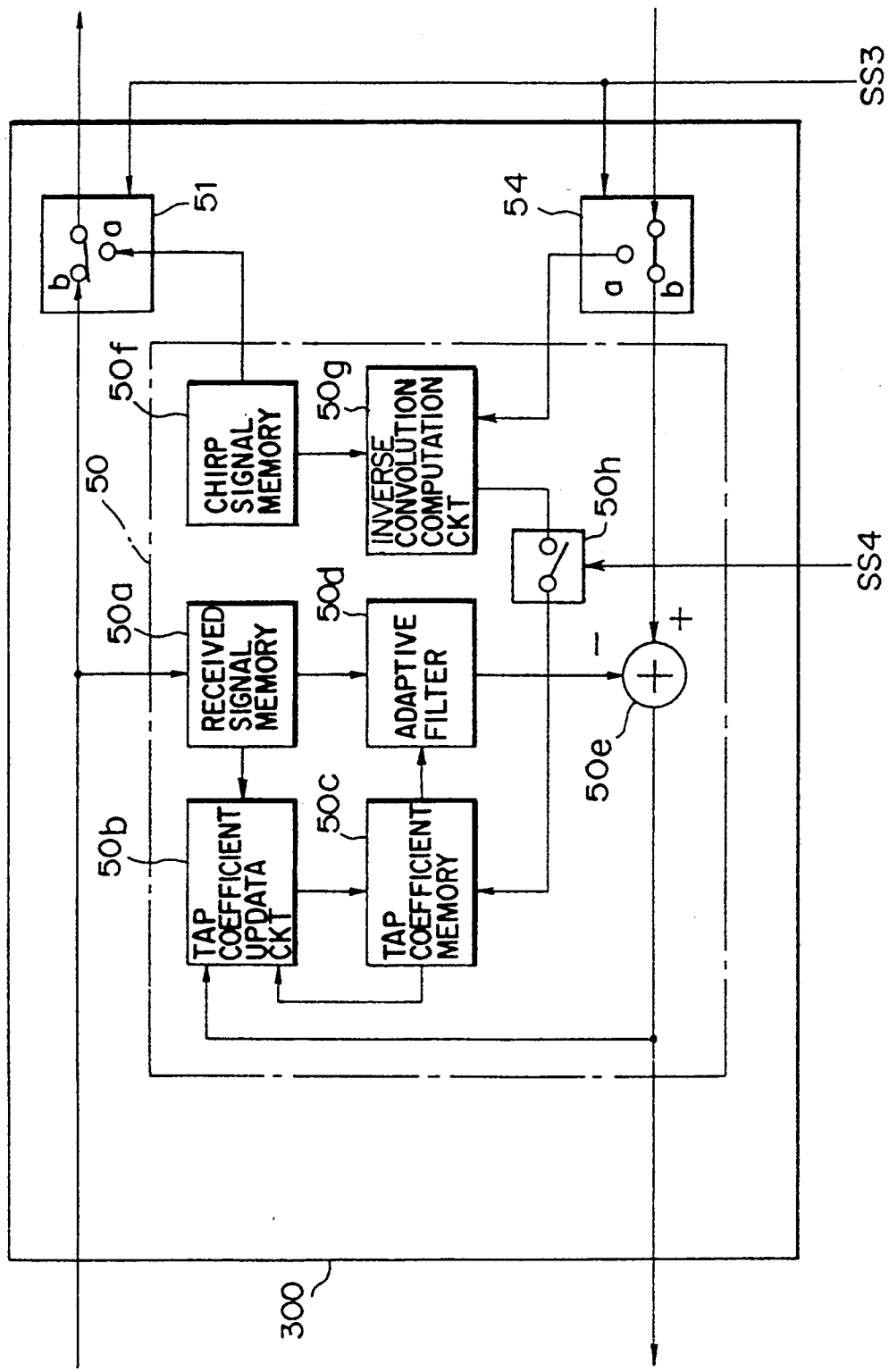
FIG. 8 is a circuit block diagram showing an arrangement of an echo canceller provided in the apparatus shown in FIG. 7.

The echo canceller 300 above has an arrangement as will be set out below. FIG. 8 illustrates a circuit block showing the arrangement of the echo canceller. In FIG. 8, the same reference numerals are employed to designate parts or elements corresponding to those shown in FIG. 3 and any further explanation of them is, therefore, omitted.

The echo canceller 300 of the present embodiment has an echo canceller body 50 comprised of, for example, a DSP and change-over switches 51 and 54.

The echo canceller body 50 comprises a received signal memory 50a, an adaptive filter 50d, an arithmetic operation unit 50e, a tap coefficient memory 50c, a tap coefficient update circuit 50b, a chirp signal memory 50f, an inverse convolution computation circuit 50g and a write switch 50h for tap coefficient initialization.

The change-over switches 51 and 54 are controlled in accordance with a control signal SS3 coming from a radio unit control circuit 5c. The switches 51 and 54 are switched to a contact b for a hands-free speaking mode and to a contact a for an initial training period.

Further, the control circuit (CONT) 5c includes, for example, a microcomputer as a major control section and a training control means 5d for performing initial training of the echo canceller 300 in addition to the normal control function of a means for establishing a speech channel upon transmission and reception, a speech control means, etc.

The training control means 5d implements the control of performing the initial training of the echo canceller 300 upon transmission and reception when the hands-free speaking mode is selected.

A console unit (CU) 5e includes a key switch group, such as a dial key, SND key and END key and a liquid crystal display unit for displaying a number dialed, an operation state of the telephone, etc. A power supply circuit 5f generates a predetermined power supply voltage Vcc based on the output of, for example, a battery 5g and supplies it to a respective associated circuit.

The operation of the telephone thus arranged will be explained below in accordance with its control procedure.

In the standby state, the control circuit 5c repeatedly monitors the arrival of incoming call data and the dial key operation upon transmission.

Figure 9:
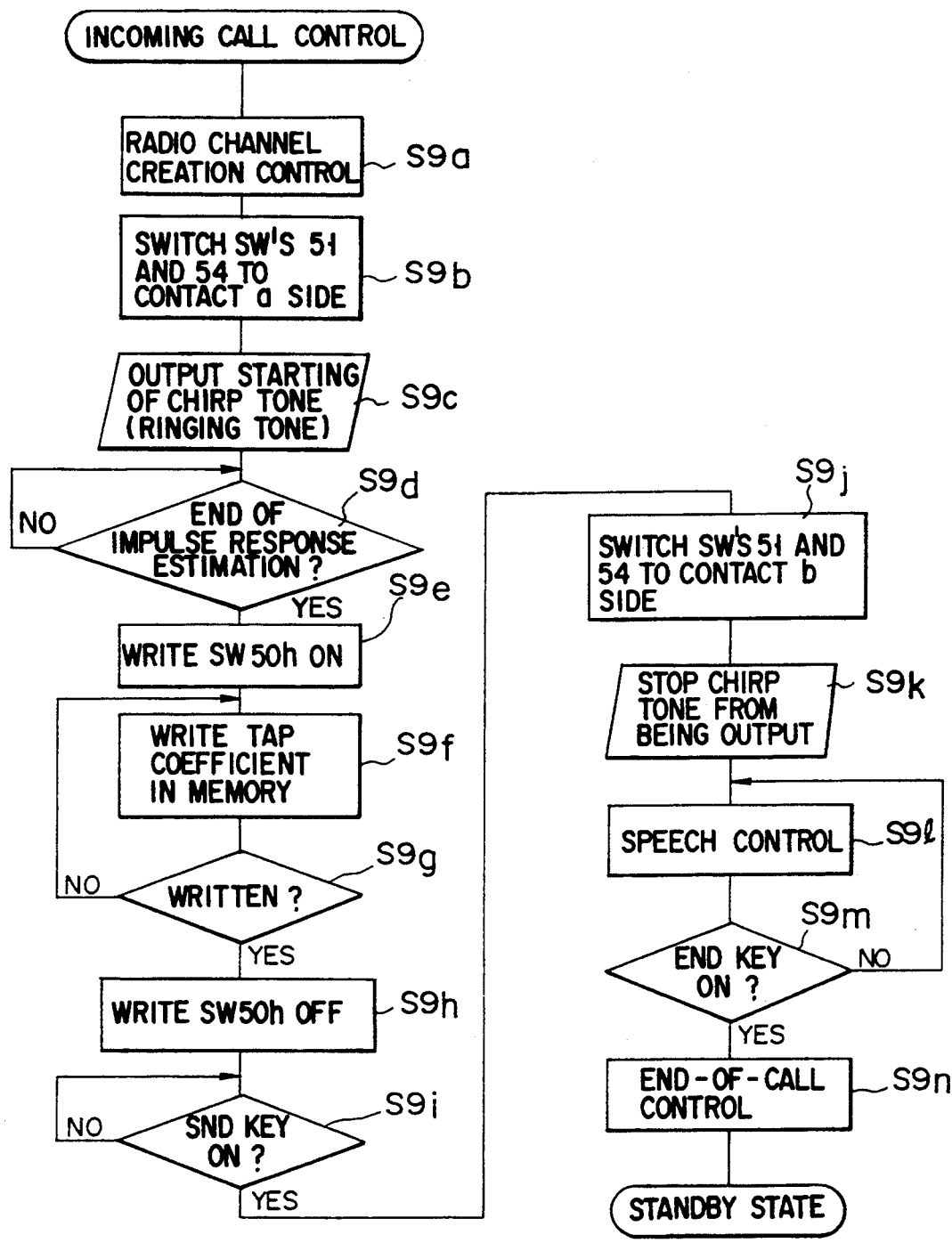
FIG. 9 is a flow chart showing an incoming call control procedure and control contents of a control circuit provided in an apparatus shown in FIG. 7.

Let it be assumed that the incoming call data arrives from a base station, not shown. In this state, the control circuit 5c creates a radio speech channel relative to the base station at step S9a as shown in FIG. 9 if the incoming call data is directed to this particular station. Then, the station is put in an acknowledge enable state. When the radio speech channel has been established, the control circuit 5c determines whether the speech mode selected is a handset speaking mode or a hands-free speaking mode. When the handset speaking mode is selected, the control circuit 5c produces a ringing tone as an output until the user responds to the incoming call tone through the operation of the SND key.

When, on the other hand, the hands-free speaking mode is selected as a speech mode, the control circuit 5c effects the initial training of the echo canceller 300. That is, the control circuit 5c supplies a control signal SS3 to the change-over switches 51 and 54 and in the echo canceller 300 at step S9b as shown in FIG. 9, thus switching the change-over switches 51 and 54 to the contact a. By so doing, a chirp signal series is read out of the chirp signal memory 50f in a given cycle. The chirp signal series is sequentially output via the change-over switch 51 to a received signal route. After the chirp signal is converted by the D/A converter 31 to an analog signal, a volume-amplified signal is output as a ringing tone. That is, the chirp tone serves also as a ringing tone.

When the chirp tone is an output, an acoustic echo is input to the microphone 5b due to the chirp tone in the hands-free speech environment. A corresponding signal converted by the A/D converter 36 to a digital signal is input to the echo canceller 300. The corresponding signal series is supplied via the change-over switch 54 to the inverse convolution computation circuit 50g in the echo canceller 300. In the inverse convolution computation circuit 50g, computation is done based on the signal series of the acoustic echo and an impulse response is estimated in the hands-free speech environment.

At this time, the control circuit 5c monitors whether or not the impulse response has been estimated at step S9d. When the impulse response has been estimated, control is shifted to step S9e and the control circuit 5c turns on the write switch 50h. At step S9f, the tap coefficient memory 50d is set to a write state. For this reason, an estimate of the impulse response output from the inverse convolution computation circuit 50g is transferred via the switch 50h to the tap coefficient memory 50d where it is written as an initial value of the tap coefficient.

When the initial setting of the tap coefficient is completed, control is shifted from step S9g to step S9h and the control circuit 5c returns the write switch 50h back to the OFF state. The operation of the SND key is monitored at step S9i. If, in this state, the user is aware of a ringing tone comprised of the chirp tone and responds to it as an acknowledge response through the depression of the SND key, the control circuit 5c switches the change-over switches 51 and 54 to the contact b at step S9j and stops the chirp tone from being output at step S9k and thereafter control is shifted to step S9l for hands-free speaking.

Thereafter, the telephone is placed in a hands-free speaking operation state and the user can talk in the hands-free speaking mode. At this time, the echo canceller 30 performs the following echo cancellation operation using, as an initial value, the tap coefficient in the tap coefficient memory 50d.

In the hands-free speaking state, the control circuit 5c monitors the operation of the END key at step S9m. When the END key is depressed, the control circuit 5c performs end-of-call control, thus returning the apparatus to a standby state.

Figure 10:
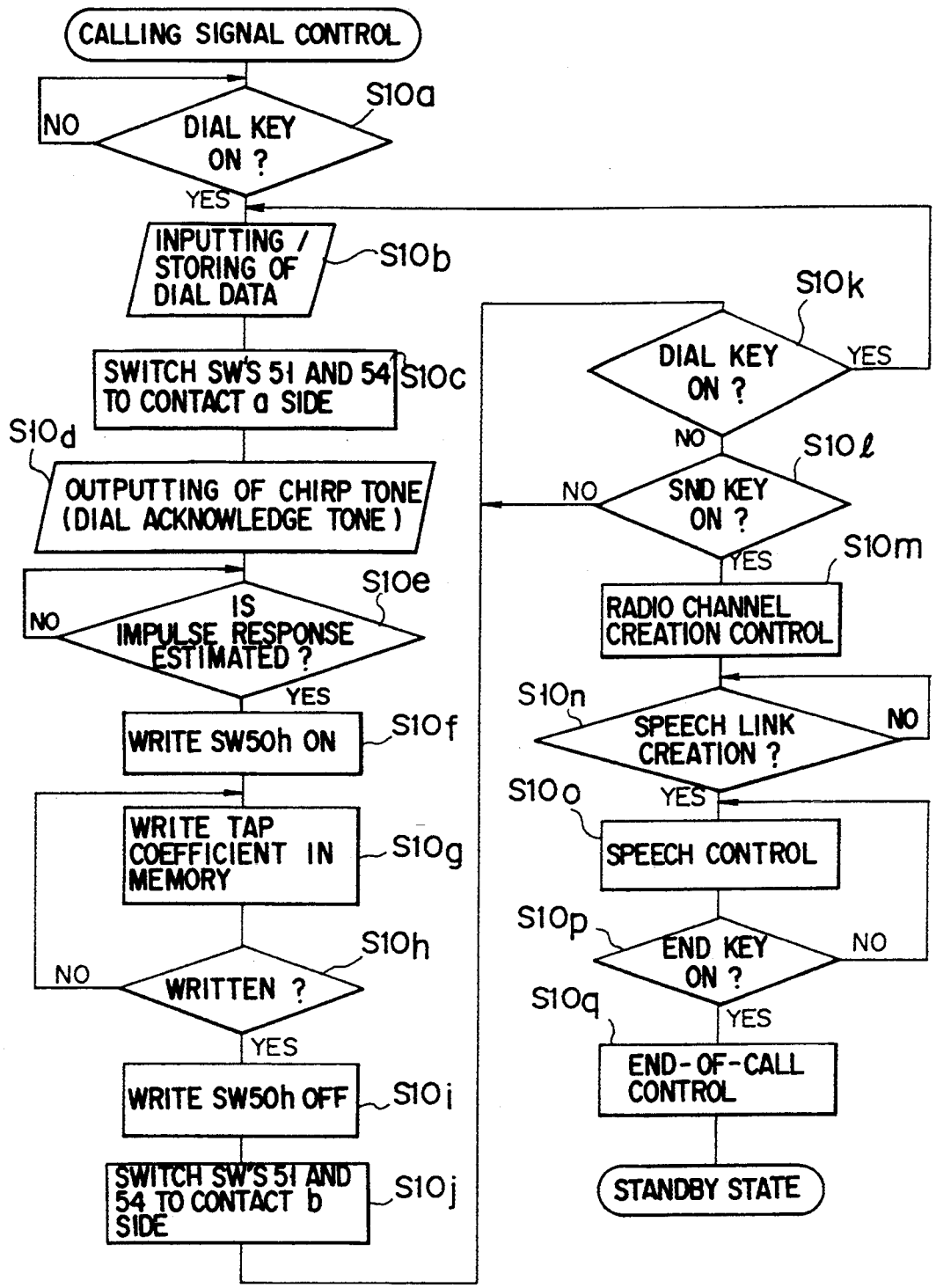
FIG. 10 is a flow chart showing a calling signal control procedure and control contents of a control circuit provided in the apparatus shown in FIG. 7.

The transmit control operation of the portable telephone according to the present invention will be explained below. FIG. 10 is a flow-chart showing a control procedure and control contents of the telephone.

Let it be assumed that the user dials the number of the called party at the telephone upon transmission. Each time the dialed number is input one digit at a time, control is shifted from step S10a to step S10b and the dial number is stored in a register in the control circuit 5c.

With the dial number entered, the control circuit 5c performs the initial training of the echo canceller 300. At step S10c, the change-over switches 51 and 54 are switched to the contact a. At step S10d, a length of chirp signal series is read out of the chirp signal memory 50f. Then the chirp signal series is output to the received signal route via the change-over switch 51. After being converted by the D/A converter 31 to an analog signal, the chirp signal is output as a dial acknowledge tone, that is, as a volume-amplified tone. That is, the chirp tone for initial training is also used as a dial acknowledge tone.

When the chirp tone is delivered as an output, a corresponding acoustic echo from the hands-free speech environment is input to the microphone 5b. After being converted by the A/D converter 36 to a digital signal, the chirp signal is sent to the echo canceller 300. A signal series corresponding to the acoustic echo is fed via the change-over switch 54 to the inverse convolution computation circuit 50g in the echo canceller 300. In the inverse convolution computation circuit 50g, computation is carried out based on the acoustic echo's signal series. By so doing, it is possible to estimate the impulse response in the hands-free speech environment.

When the estimation of the impulse response is completed, control is shifted from step S10e to step S10f and the control circuit 5c turns on the write switch 50h and, at step S10g, sets the tap coefficient memory 50d to a write state. For this reason, the estimate of the impulse response output from the inverse convolution computation circuit 50g is transferred via the write switch 50h to the tap coefficient memory 50d where it is written as an initial value of the tap coefficient to the tap coefficient memory 50d. When the initialization of the tap coefficient is completed, control is shifted from step S10h to step S10i and the control circuit 5c places the write switch 50h back to the OFF state. At step S10j, the change-over switches 51 and 54 switch to the contact b. Thus, the initial training of the echo canceller 300 ends.

Then the control circuit 5c monitors, at steps S10k and step S10, the next dialed digit and the SND key. When, in this state, the subsequent digit of the dialed number is entered, control is returned back to step S10b and the control circuit 4c performs the control of making an initial training operation at step S10c through step S10j as set out in connection with the previous embodiment. Thereafter, each time the digital of the dial number is entered, similarly the control circuit 5c performs initial training of the echo canceller 300. That is, each time the digit of the dial number is entered, the initial training of the echo canceller 300 is carried out based on the chirp tone which has been output from the speaker 5b as a dial acknowledge tone.

Let it be assumed all the digits of the dialed number have been input and the user depresses the SND key. Then the control circuit 5c establishes a radio channel relative to the base station at step S10m. In establishing the radio channel, dial information is sent out which corresponds to the previously entered and stored dial information. With the radio channel thus established, the control circuit 5c monitors, at step S10n, a response from the telephone of the called party on the basis of that speech link state. When, in this state, the telephone of the called party picks up the handset as an off-hook response and establishes a speech link, control is shifted from step S10n to step S10o and the control circuit 5c starts the hands-free speech control and the user can talk in the hands-free speaking mode.

In the hands-free speaking mode, the control circuit 5c monitors the operation of the END key at step S10p. When, in this state, the END key is depressed, control is shifted to step S10q and the control circuit 5c establishes end-of-call control and then returns the telephone to the standby state.

According to the present invention, since the initial training of the echo canceller 300 is done at the incoming call and calling times, high quality hands-free speech can be achieved without receiving any adverse effect from the acoustic echo from a time immediately following the start of speaking. Further, since the initial training is performed during the incoming call control and calling control preceding the hands-free speaking state, no effect of the initial training is exerted on the hands-free speaking.

According to the present invention, the chirp tone is used as the ringing tone and dial acknowledge tone and the user can perform the initial training smoothly without being made aware of the presence of the chirp tone. Further, there is no need to provide an oscillation circuit for generating a tinging tone and dial acknowledge tone. It is thus possible to simplify the circuit arrangement involved.

In the present invention, the initial training of the echo canceller 300 is made based on the chirp tone which is produced as the tinging tone and dial acknowledge tone, thus enabling the initial training to be done in an adequate time. It is thus possible to effect the initial training very accurately.

A third embodiment shows an example in which the present invention is applied to an analog, portable telephone having a handset speaking function and hands-free speaking function.

Figure 11:
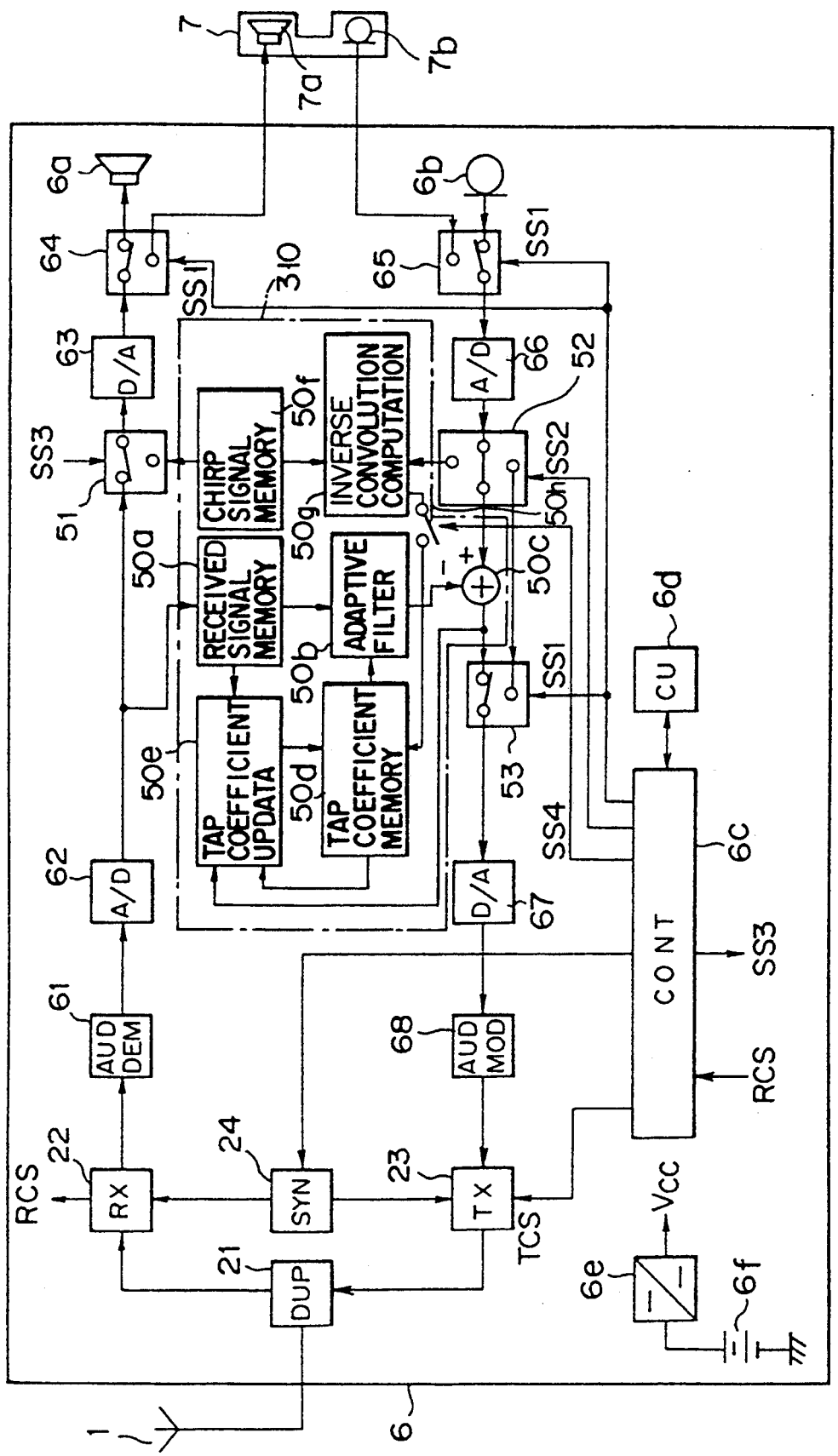
FIG. 11 is a circuit block diagram showing an arrangement of a speech communication apparatus according to a third embodiment of the present embodiment.

FIG. 11 illustrates a circuit block showing an arrangement of the analog, portable telephone. In FIG. 11, the same reference numerals are employed to designate pans or elements corresponding to those in FIGS. 2A, 2B and 7 and any further detailed explanation of them is, therefore, omitted.

The telephone apparatus of the present invention comprises an antenna 1, a portable telephone body 6 and a handset 7 connected via a cuff cord to the telephone body 6. The handset includes a handset speaker 7a and a handset microphone 7b.

The telephone body 6 includes not only a circuit system for analog communication but also a hands-free speaker 6a, hands-free microphone 6b, control circuit (CONT) 6c, and echo canceller 310 comprised of a DSP.

A received intermediate frequency signal output from a receiving circuit 3 is frequency modulated by an analog speech demodulation circuit (AUDDEM) 61 to a baseband received speech signal and then converted by an A/D converter 62 to a digital signal for input to the echo canceller 310. The digital received speech signal is supplied to the echo canceller 310 on one branched route and input to a D/A converter 63 on the other route via a change-over switch 51 so that the digital signal is converted to an analog signal. The analog signal is supplied via a change-over switch 64 to a hands-free speaker 6a where it is output as a volume-amplified tone.

A speaking tone of the user and an acoustic echo operation produced from around the hands-free speaker 6a are picked up by the hands-free microphone 6b and, being subjected to an acoustic/electric conversion, input via a change-over switch 65 to an A/D converter 66. After a corresponding signal is converted by the A/D converter 66 to a digital signal for input to the echo canceller 310, the digital signal is input via a change-over switch 52 to an arithmetic operation unit 50c in the echo canceller 310. The arithmetic operation unit 50c subtracts, from the digital transmit speech signal, a false echo produced from an adaptive filter 50b and cancels an acoustic echo component contained in the digital transmit speech signal. A digital transmit speech signal produced from the arithmetic operation unit 50c in the echo canceller 310 is converted by a D/A converter 67 to an analog transmit signal via a change-over switch 53. The analog transmit signal is input to an analog speech modulation circuit (AUDMOD) 68 where a corresponding transmit carrier signal is, for example, frequency modulated by the analog transmit speech signal. The modulated transmit carrier signal is frequency converted by a transmit circuit 23 to a radio channel frequency, amplified to a predetermined transmit power level, and transmitted via a duplexer 21 to a base station, not shown.

The change-over switches 51, 52, and 53 are located outside a DSP circuit of the echo canceller 310. The echo canceller 310 comprises a received signal memory 50a, an adaptive filter 50b, an arithmetic operation unit 50c, a tap coefficient memory 50d, a tap coefficient update circuit 50e, a chirp signal memory 50f, an inverse convolution computation circuit 50g and a write switch 50h for tap coefficient initialization.

In FIG. 11, a console unit (CU) 6d includes a key switch group, such as dial keys, a SND key, END key and speech mode designation key and a liquid crystal display unit for displaying a called party's dialed number, the operation state of the apparatus, etc. A power supply circuit 6e generates a predetermined power voltage Vcc based on, for example, the output of a battery 6f and supplies it to each associated circuit.

In the arrangement above, when the handset speaking mode is designated, the change-over switches 64 and 65 are switched to the handset 7 side by a change-over control signal SS1 which is output from the control circuit 6c. For this reason, the handset speaker 7a in the handset 7 is connected to the D/A converter 63 in a receive circuit system and the handset microphone 7b in the handset 7 is connected to the A/D converter 66 in a transmit circuit system. Further, the change-over switches 53 and 52 are switched to a short-circuiting side in accordance with the change-over control signals SS1 and SS2. In the transmit circuit system, therefore, a direct connection is achieved between the A/D converter 66 and the D/A converter 67.

When speech is made in this mode, a received speech signal reproduced in the receive circuit system is output from the handset speaker 7a in the handset 7. In the transmit circuit system, the user's speech signal detected by the handset microphone 7b in the handset 7 and subjected to an acoustic/electric conversion is input to the analog speech conversion circuit 68. A radio carrier signal which is frequently modulated by the transmit speech signal is transmitted toward the base station. In this way, handset speaking is carried out.

Now let it be assumed that the user operates the mode designation switch of the console unit 6d selecting the hands-free speaking mode. At a time when an incoming call response operation at an incoming call time or a SND key operation at a calling time is performed, the control circuit 6c initially trains the echo canceller 310. That is, the control circuit 6c outputs the change-over control signal SS1 to the change-over switches 64, 65 and 53 and the change-over switches 64 and 65 are switched to the hands-free speaker 6a side and hands-free microphone 6b side, respectively, and the change-over switch 53 is switched to the arithmetic operation unit 50c side in the echo canceller 310. The control circuit delivers the change-over control signal SS3 to the change-over switch 51 to switch the change-over switch 51 to the chirp signal memory 50f. The control circuit delivers the change-over control signal SS2 to the change-over switch 52 to switch the change-over switch 52 to an inverse convolution computation circuit 50g side in the echo canceller 310. In this state, a chirp signal series is read out of the chirp signal memory 50f.

By so doing, a given length of a chirp signal series is read out of the chirp signal memory 50f, converted by the D/A converter 63 to an analog signal, and supplied via the change-over switch 64 to the hands-free speaker 6a where a chirp tone is output as a volume-amplified tone. An acoustic echo resulting from the chirp tone produced from around the hands-free microphone 6b is converted by the A/D converter 66, and input to the inverse convolution computation circuit 50g in the echo canceller 310 via the change-over switch 52. The inverse convolution computation circuit 50g performs an inverse convolution computation based on the digital signal series corresponding to the acoustic echo, thus estimating an impulse response of the acoustic echo. Upon the completion of that estimation, the control circuit 5c turns the write switch 50h ON. An estimate of the impulse response obtained from the inverse convolution computation circuit 50g is transferred via the write switch 50h to the tap coefficient memory 50d where an initial value of the tap coefficient is written.

At the completion of the initial training of the echo canceller 310, the change-over switch 50h is turned OFF and the control circuit 5c switches the change-over switch 51 from the echo canceller 310 side to the receive route side and the change-over switch 52 from the inverse convolution computation side to the arithmetic operation unit 50c side. Thereafter, the echo canceller 310 is placed in a learning mode and the apparatus is placed in the hands-free speaking state.

According to the present embodiment, an analog, portable telephone apparatus can cancel an acoustic echo produced at a hands-free speaking mode and can perform high quality hands-free speaking.

A fourth embodiment is directed to a mobile radio telephone apparatus having a handset speaking mode and hands-free speaking mode, in which, even if the handset speaking mode is selected at an incoming call time and at a calling time, the initial training of the echo canceller can be done as if the hands-free speaking mode is selected.

Figure 12A:
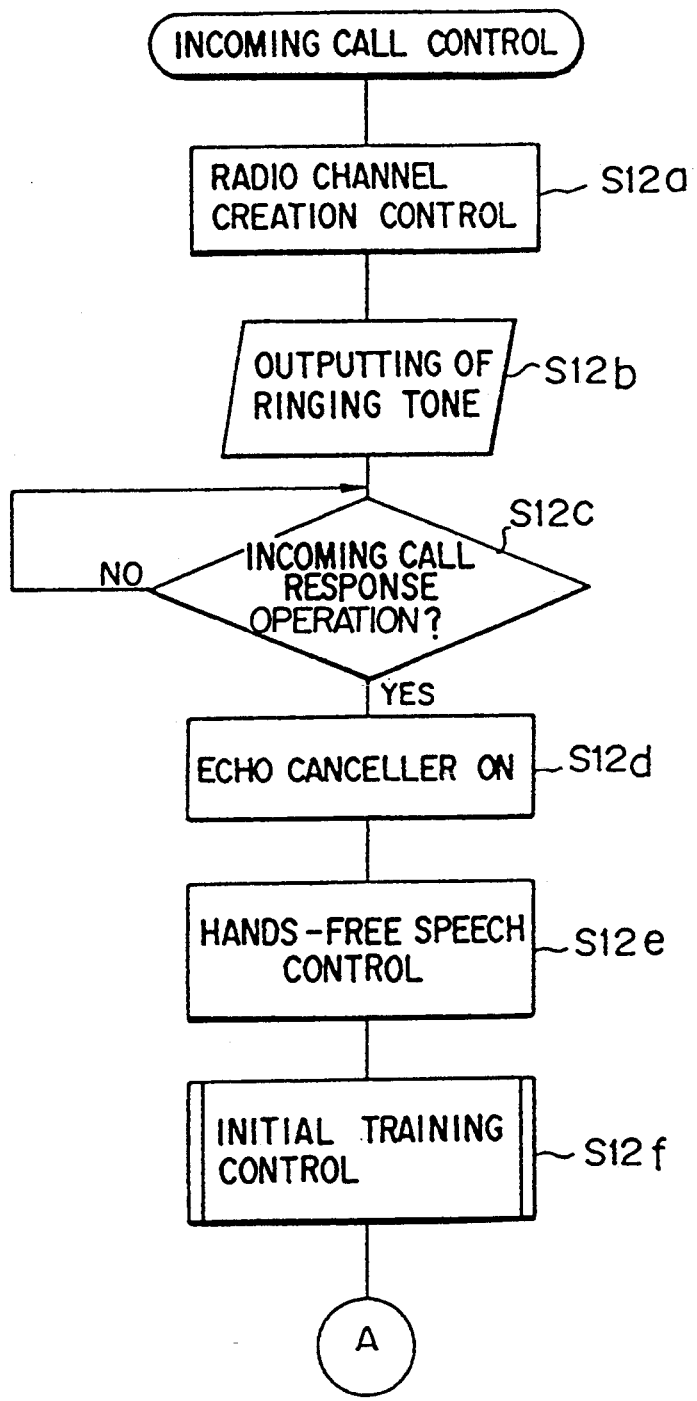
FIGS. 12A and 12B, each, are a flow chart showing an incoming call control procedure and control contents in a speech communication apparatus according to a fourth embodiment of the present invention.
Figure 12B:
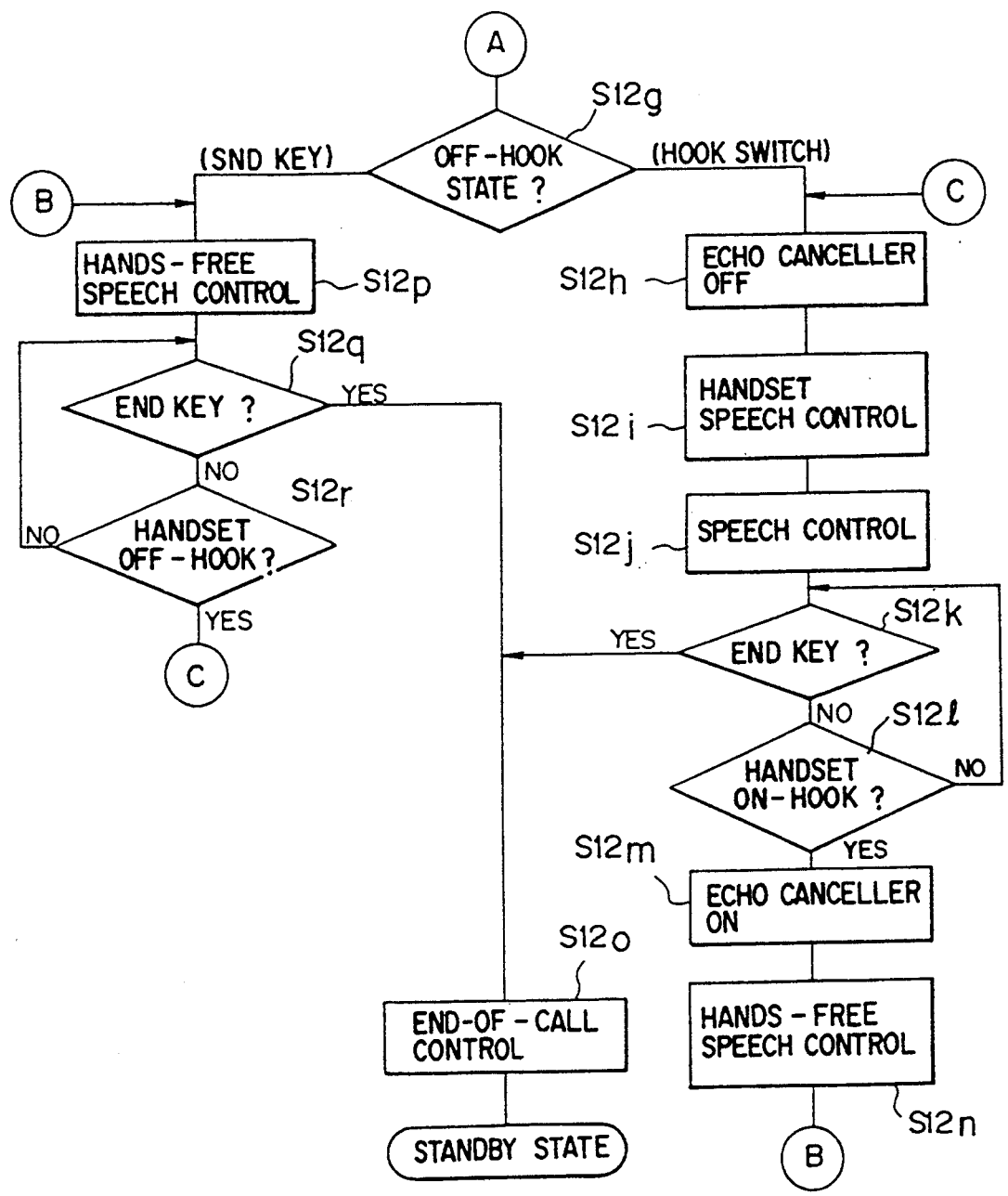

FIGS. 12A and 12B, each, are a flow chart showing a control procedure and control contents of the present apparatus. When, in these Figures, an incoming call signal is detected, the apparatus implements the control of establishing a radio channel relative to a base station at step S12a. With the radio channel thus established, a ringing tone is output from the hands-free speaker, for example, at step S12b, thus informing the user of an arrival of an incoming call signal. In this state, let it be assumed that the user responds by, for example, lifting up the handset. Then the apparatus detects an incoming call response operation at step S12c and enables a shift to the initial training of the echo canceller.

Figure 6:
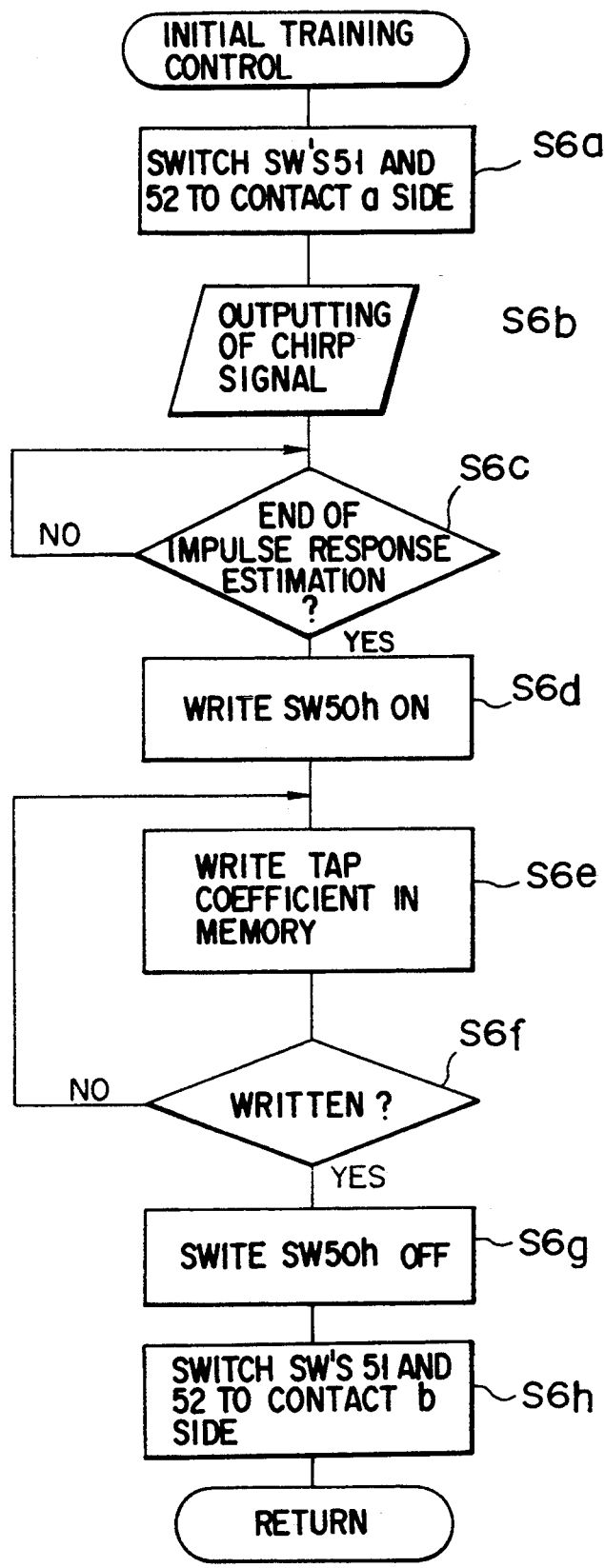
FIG. 6 is a flow chart for showing an initial training control procedure and control contents of a control circuit shown in FIGS. 2A and 2B.

That is, the apparatus first sets the echo canceller in an operative state at step S12d and implements hands-free speech enable control at step S12e. With hands-free speaking, enabled control is shifted to step S12f for performing the initial training of the echo canceller using a chirp tone. The control procedure and control contents of the initial training is shown in FIG. 6.

At the completion of the initial training of the echo canceller, control is shifted to step S12g and the apparatus determines whether the previous incoming call response operation is done through the operation of the SND key or by lifting the handset.

If the incoming call response operation is done through the operation of the SND key, the apparatus determines that the hands-free speaking mode is selected. Control is shifted to step S12p and the apparatus starts hands-free speech control. Hereinafter, the user can talk in the hands-free speaking mode. At this time, the echo canceller starts canceling an acoustic echo contained in a transmit speech signal using the initialized tap coefficient as an initial value.

In the hands-free speaking state, the apparatus monitors the operation of the END key and off-hook operation of the handset at step S12q and S12r, respectively. When, in this state, the END key is depressed, control is shifted to step S12 and the apparatus carries out end-of-call control, thus being returned to the standby state.

When, on the other hand, the incoming call response operation is made by lifting the handset, the apparatus determines that the handset speaking mode has been selected. The apparatus makes handset speaking mode enable control. That is, the echo canceller is set to an inoperative state at step S12h and then performs handset speech control at step S12i. When the apparatus sets the receiving circuit system and transmit circuit system in the handset speaking state, the apparatus starts handset speech control at step S12j. Thus the user can talk in the handset speaking mode.

In the handset speaking state, the apparatus monitors the END key operation and handset on-hook operation at steps S12k and S12. With the END key depressed, the apparatus performs end-of-call control at step S12o and is returned to a standby state.

Let it be assumed that, in order to switch the speech mode from the handset speaking mode to the hands-free speaking mode, the handset is returned back to the cradle. Control is shifted from step S12l to step S12m and the apparatus first sets the echo canceller from an inoperative state to an operative state. Control is shifted to step S12n and the apparatus performs hands-free speech control. With the apparatus set in the hands-free speech state, step S12p shifts control to the hands-free speech control.

That is, let it be assumed that during handset speaking, the speech mode is switched to the hands-free speaking mode. At this time, the initial training of the echo canceller is omitted and a shift is made to the hands-free speaking mode.

Although incoming call control has been done, it is possible even at the transmit control to implement initial training, at a point in time when it is detected that the speech link is established. A similar operation can be carried out by shifting the speech mode to a corresponding speech state involved after the initial training has been completed.

In the present embodiment, at the creation of the speech link upon incoming call response operation and at a calling time, the initial training of the echo canceller is carried out either at the hands-free speaking mode or at the handset speaking mode and speech control is made in accordance with a speech mode selected after completion of the initial training. In the case where the operation of switching the speech mode to the hands-free speaking mode is carried out during handset speaking, the speech state can immediately be shifted to a hands-free free speaking state at that time without the initial training of the echo canceller. It is, therefore, possible to very briefly and smoothly switch modes during speaking thereby enhancing the speech quality.

The present invention is not restricted to the preceding embodiments above. Although, in the second embodiment, the initial training of the echo canceller has been explained as being done, at the incoming call time, by outputting a chirp tone in place of a ringing tone, the initial training may be effected by outputting the chirp tone in place of the operation acknowledge tone of the SND key. Instead of performing initial training by outputting a chirp tone in place of the dial acknowledge tone, it is also possible to carry out the initial training by outputting a chirp tone in place of the ringing tone.

In the third embodiment, with the handset speaking state set, the A/D converter 62 and D/A converter 63 are provided on the transmit route and the A/D converter 66 and D/A converter 67 are provided on the receive route. Bypass circuits each including a switch are provided such that one of the associated switches is connected in parallel with the A/D converter 62 and D/A converter 63 and the other associated switch is connected in parallel with the A/D converter 66 and D/A converter 67. Those transmit and receive routes may be provided, without passing through the A/D converters 62 and 66 and D/A converters 63 and 67, in which case these switches of the bypass circuits are turned ON during the handset speech period. By so doing, it is possible to eliminate processing delay and signal distortion at the A/D converters 62, 66 and D/A converters 63, 67 and, therefore, to realize high quality handset speaking. It is also possible to decrease wasteful power consumption by interrupting a power supply to the A/D converters 62, 66, and D/A converters 63, 67. This advantage is very useful in those apparatuses, such as the portable telephone apparatuses and cordless telephone apparatuses in particular, using a battery as a power supply, because the battery life can be extended.

As shown in Japanese Patent Application H3-339296, corresponding to U.S. patent application Serial No. 07/800,426, etc., having its subject matter incorporated into the present invention by reference, in order to render the echo canceller in an operative/inoperative state, a power supply to the echo canceller may be turned ON/OFF or a supply of an operation clock signal may also be made or interrupted.

Further, the circuit arrangement of the echo canceller, the control procedure and control contents of the initial training control means, the various arrangements of those apparatuses to which the present invention are applied can be variously changed or modified without departing from the spirits and scope of the present invention.

We claim:
1. A communication apparatus comprising:
   a receiver for receiving a first speech signal;
   a chirp signal generator for generating a chirp signal;
   a speaker for selectively outputting the first speech signal and the chirp signal;
   a microphone for generating a transmit signal in accordance with a second speech signal; and
   an echo canceler circuit including estimating means for estimating an acoustic echo associated with an acoustic echo path from said speaker to said microphone based on an acoustic echo of either the first speech signal or the chirp signal, and subtracting the estimated acoustic echo from the transmit signal.

2. The communication apparatus according to claim 1, further comprising:
   detecting means for detecting a predetermined state for starting hands-free operation of said communication apparatus;
   a control circuit including first control means for controlling said speaker to output the chirp signal if the predetermined state is detected and second control means for controlling said echo canceler circuit to estimate the acoustic echo based on the acoustic echo of the chirp signal.

3. A communication apparatus comprising:
   a receiver for receiving a first speech signal;
   tone generating means for generating an incoming call acknowledge tone when a call is incoming;
   a chirp signal generator for generating a chirp signal;
   a handset speaker for outputting the first speech signal;
   a hands-free speaker for selectively outputting the first speech signal, the chirp signal, and the incoming call acknowledge tone;
   a microphone for generating a transmit signal in accordance with a second speech signal;
   an echo canceler circuit including estimating means for estimating an acoustic echo associated with an acoustic echo path from said speaker to said microphone based on an acoustic echo of either the first speech signal or the chirp signal, and subtracting the estimated acoustic echo from the transmit signal;
   selecting means, responsive to a user signal following generation of the incoming call acknowledge tone, for selecting one of a hands-free speaking state in which said hands-free speaker selectively outputs the first speech signal and the chirp signal and a handset speaking state in which said handset speaker outputs the first speech signal;
   detecting means, responsive to said selecting means, for detecting the hands-free speaking state; and
   a control circuit including first control means for controlling said hands-free speaker to output the chirp signal if the hands-free speaking state is detected and second control means for controlling said echo canceler circuit to estimate the acoustic echo based on the acoustic echo of the chirp signal.

4. The communication apparatus of claim 3, wherein said first control means effects output of the chirp signal from said hands-free speaker as the incoming call acknowledge tone when said detecting means detects the hands-free speaking state.

5. The communication apparatus of claim 3, wherein said first control means effects output of the incoming call acknowledge tone followed by the chirp signal from said hands-free speaker when said detecting means detects the hands-free speaking state.

6. A communication apparatus comprising:
   a receiver for receiving a first speech signal;
   a chirp signal generator for generating a chirp signal;
   a speaker for selectively outputting either the first speech signal or the chirp signal;
   a microphone for generating a transmit signal in accordance with a second speech signal;
   an echo canceler circuit including estimating means for estimating an acoustic echo associated with an acoustic echo path from said speaker to said microphone based on an acoustic echo of either the first speech signal or the chirp signal, and subtracting the estimated acoustic echo from the transmit signal;
   incoming call detecting means for detecting an incoming call signal; and
   a control circuit including first control means for controlling said speaker to output the chirp signal if said detecting means detects the incoming call signal and second control means for controlling said echo canceler circuit to estimate the acoustic echo based on the acoustic echo of the chirp signal.

7. The communication apparatus of claim 6 wherein said first control means effects output of the chirp signal as an alarm tone from said speaker when said detecting means detects the incoming call signal.

8. The communication apparatus of claim 6 further comprising alarm tone generating means for generating an alarm tone responsive to the said detecting means detecting the incoming call signal, said speaker outputting said alarm tone, wherein said first control means effects output of the chirp signal from said speaker at least one of prior to output of an alarm tone, between output of two alarm tones, and following output of the alarm tone.

9. A communication apparatus comprising:
a receiver for receiving a first speech signal;
a chirp signal generator for generating a chirp signal;
a speaker for selectively outputting either the first speech signal or the chirp signal;
a microphone for generating a transmit signal in accordance with a second speech signal;
an echo canceler circuit including estimating means for estimating an acoustic echo associated with an acoustic echo path from said speaker to said microphone based on an acoustic echo of either the first speech signal or the chirp signal, and subtracting the estimated acoustic echo from the transmit signal;
detecting means for detecting creation of a speech link between said communication apparatus and another communication apparatus; and
a control circuit including first control means for controlling said speaker to output the chirp signal if said detecting means detects the creation of the speech link and second control means for controlling said echo canceler circuit to estimate the acoustic echo based on the acoustic echo of the chirp signal.

10. A communication apparatus comprising:
a receiver for receiving a first speech signal;
a chirp signal generator for generating a chirp signal;
a speaker for selectively outputting either the first speech signal or the chirp signal;
a microphone for generating a transmit signal in accordance with a second speech signal;
an echo canceler circuit including estimating means for estimating an acoustic echo associated with an acoustic echo path from said speaker to said microphone based on an acoustic echo of either the first speech signal or the chirp signal, and subtracting the estimated acoustic echo from the transmit signal;
input means for inputting a call start instruction to initiate a calling operation; and
a control circuit including first control means for controlling said speaker to output the chirp signal if said input means inputs the call start instruction and second control means for controlling said echo canceler circuit to estimate the acoustic echo based on the acoustic echo of the chirp signal.

11. The communication apparatus of claim 10 wherein said first control means effects output of the chirp signal as an outgoing call acknowledge tone when the call start instruction is input by said input means.

12. The communication apparatus of claim 10 further comprising means for generating an outgoing call acknowledge tone, said speaker outputting the outgoing call acknowledge tone, wherein said first control means effects output from said speaker of the outgoing call acknowledge tone followed by the chirp signal when the call start instruction is input by said input means.

13. A communication apparatus comprising:
a receiver for receiving a first speech signal;
a chirp signal generator for generating a chirp signal;
a speaker for selectively outputting either the first speech signal or the chirp signal;
a microphone for generating a transmit signal in accordance with a second speech signal;
an echo canceler circuit including estimating means for estimating an acoustic echo associated with an acoustic echo path from said speaker to said microphone based on an acoustic echo of either the first speech signal or the chirp signal, and subtracting the estimated acoustic echo from the transmit signal;
input means for inputting dial information for a calling operation; and
a control circuit including first control means for controlling said speaker to output the chirp signal if said input means inputs the dial information and second control means for controlling said echo canceler circuit to estimate the acoustic echo based on the acoustic echo of the chirp signal.

14. The communication apparatus of claim 13 wherein said first control means effects output of the chirp signal from said speaker as an outgoing call acknowledge tone when the dial information is input by said input means.

15. The communication apparatus of claim 13 further comprising means for generating an outgoing call acknowledge tone, said speaker outputting the outgoing call acknowledge tone, wherein said first control means effects output from said speaker of the outgoing call acknowledge tone followed by the chirp signal when the dial information is input by said input means.

16. A speech communication apparatus comprising:
a first speaker for handset speaking and for outputting a first received signal;
a first microphone for handset speaking and for generating a first transmit signal;
a chirp signal generator for generating a chirp signal;
a second speaker for hands-free speaking and for selectively outputting either a second received signal or the chirp signal;
a second microphone for hands-free speaking for generating a second transmit signal;
selecting means for selecting one of a handset speaking mode and a hands-free speaking mode;
a first controller, responsive to selection of the handset speaking mode by said selecting means, for connecting said first speaker to a first received signal path and said first microphone to a first transmit signal path;
a second controller, responsive to selection of the hands-free speaking mode by said selecting means, for connecting said second speaker to a second received signal path and said second microphone to a second transmit signal path;
an echo canceler including estimating means for estimating an acoustic echo associated with an acoustic echo path from said second speaker to said second microphone, and subtracting the estimated acoustic echo from the second transmit signal;
a control circuit, responsive to selection of the hands-free speaking mode by said selecting means when in the handset speaking mode, including first control means for controlling said second speaker to output the chirp signal when said second controller connects said second speaker to the received signal path and said second microphone to the transmit signal path and second control means for controlling said echo canceler to estimate the acoustic echo based on the acoustic echo of the chirp signal.

17. The speech communication apparatus of claim 16 further comprising:
   a handset, said handset including said first speaker and said first microphone; and
   a cradle, said cradle including said second speaker and said second microphone, wherein responsive to placement of said handset on said cradle during said handset speaking mode, said first control means effects output of the chirp signal from said second speaker.

18. The speech communication apparatus of claim 16 wherein responsive to selection of the hands-free speaking mode by said selecting means when in the handset speaking mode, said second control means effects operation of said echo canceler and said first control means effects output of the chirp signal from said second speaker.

19. A speech communication apparatus comprising:
   a first speaker for handset speaking;
   a first microphone for handset speaking;
   a chirp signal generator for generating a chirp signal;
   a second speaker for hands-free speaking and outputting the chirp signal;
   a second microphone for hands-free speaking and for generating a transmit signal;
   an echo canceler circuit including estimating means for estimating an acoustic echo associated with an acoustic echo path from said second speaker to said second microphone based on an acoustic echo of the chirp signal, and subtracting the estimated acoustic echo from the transmit signal;
   generating means for generating an incoming call signal and for generating an outgoing calling signal;
   detecting means for detecting the generation of the incoming call signal and the outgoing calling signal;
   speaking mode selecting means for selecting one of a handset speaking mode and a hands-free speaking mode;
   a control circuit, responsive to detection of at least one of the incoming call signal and the outgoing calling signal by the detecting means, including first control means for controlling said second speaker to output the chirp signal prior to entering either the handset speaking mode or the hands-free speaking mode and second control means for controlling said echo canceler circuit to estimate the acoustic echo based on the acoustic echo of the chirp signal;
   a speech controller, responsive to said speaking mode selecting means, for entering one of the handset speaking mode and the hands-free speaking mode following said echo canceler circuit estimating an acoustic echo based on the acoustic echo of the chirp signal.

* * * * *